US007565820B2

(12) United States Patent
Foster et al.

(10) Patent No.: US 7,565,820 B2
(45) Date of Patent: Jul. 28, 2009

(54) METHODS AND APPARATUS FOR FORMING HEAT TREATED OPTICAL FIBER

(75) Inventors: John D. Foster, Wilmington, NC (US); Hazel B. Matthews, III, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 416 days.

(21) Appl. No.: 10/424,452

(22) Filed: Apr. 28, 2003

(65) Prior Publication Data

US 2004/0013336 A1    Jan. 22, 2004

Related U.S. Application Data

(63) Continuation-in-part of application No. 10/136,697, filed on Apr. 30, 2002.

(51) Int. Cl.
    *C03B 37/07* (2006.01)
(52) U.S. Cl. .......................................... 65/384; 65/434
(58) Field of Classification Search .................. 65/384, 65/475, 488, 510, 533, 424, 434, 507, 435
    See application file for complete search history.

(56) References Cited

U.S. PATENT DOCUMENTS

| 3,782,914 | A |   | 1/1974  | DeLuca et al. ................ 65/3    |
|-----------|---|---|---------|---------------------------------------|
| 4,154,592 | A |   | 5/1979  | Bailey .......................... 65/2 |
| 4,304,582 | A |   | 12/1981 | Aussenegg et al. ........... 65/12     |
| 4,396,409 | A |   | 8/1983  | Bailey et al. ................. 65/3.11|
| 4,673,427 | A | * | 6/1987  | Van Der Giessen et al. ... 65/424      |
| 4,874,415 | A | * | 10/1989 | Boniort et al. ................ 65/432 |
| 5,059,229 | A |   | 10/1991 | Blankenship et al. ........... 65/2    |
| 5,284,499 | A |   | 2/1994  | Harvey et al. ................ 65/3.11 |
| 5,314,515 | A |   | 5/1994  | Cain .......................... 65/3.11 |
| 5,320,658 | A |   | 6/1994  | Ohga et al. ................... 65/3.11 |
| 5,838,946 | A | * | 11/1998 | Petolino, Jr. ................. 711/134 |
| 5,897,681 | A |   | 4/1999  | Lysson et al. ................. 65/435  |
| 2001/0005993 | A1 |   | 7/2001 | Guenot et al. ................ 65/434   |
| 2001/0006262 | A1 |   | 7/2001 | Dubois et al. ............... 264/1.24  |

(Continued)

FOREIGN PATENT DOCUMENTS

DE          37 13 029          11/1988

(Continued)

OTHER PUBLICATIONS

Patent Abstracts of Japan, 60-221337; Kazuo et al.; Fujikura LTD, Nov. 6, 1985.

(Continued)

*Primary Examiner*—Carlos Lopez
*Assistant Examiner*—Queenie Dehghan
(74) *Attorney, Agent, or Firm*—Matthew J. Mason; Joseph M. Homa; Randall S. Wayland

(57) ABSTRACT

A method for forming an optical fiber includes drawing the optical fiber from a glass supply and treating the fiber by maintaining the optical fiber within a treatment temperature range for a treatment time. Preferably also, the fiber is cooled at a specified cooling rate. The optical fiber treatment reduces the tendency of the optical fiber to increase in attenuation due to Rayleigh scattering, and/or over time following formation of the optical fiber due to heat aging. Apparatus are also provided.

23 Claims, 9 Drawing Sheets

U.S. PATENT DOCUMENTS

| | | | |
|---|---|---|---|
| 2002/0044753 A1 | 4/2002 | Nagayama et al. | 385/123 |
| 2002/0059816 A1 | 5/2002 | Nagayama et al. | 65/435 |
| 2002/0194881 A1 | 12/2002 | Nagayama et al. | 65/424 |
| 2003/0086670 A1* | 5/2003 | Moridaira et al. | 385/123 |
| 2003/0205066 A1* | 11/2003 | Ghani et al. | 65/430 |

FOREIGN PATENT DOCUMENTS

| | | |
|---|---|---|
| EP | 1112977 A1 * | 7/2001 |
| EP | 1 191 367 A2 | 3/2002 |
| EP | 1 205 449 | 5/2002 |
| EP | 1 281 988 | 5/2002 |
| JP | 60-103052 | 6/1985 |
| JP | 2-74542 | 3/1990 |
| JP | 6-211535 | 8/1994 |
| JP | 9-142890 | 6/1997 |
| JP | 10-194770 | 7/1998 |
| JP | 11-116264 | 4/1999 |
| JP | 2000-128566 | 5/2000 |
| JP | 2002-338289 | 11/2002 |
| WO | WO 00/73223 | 12/2000 |
| WO | WO 00/73224 | 12/2000 |
| WO | WO 01/27045 | 4/2001 |

OTHER PUBLICATIONS

K. Tsujikawa et al, "Rayleigh Scattering Reduction Method for Silica-Based Optical Fiber", Journal of Lightwave Technology, vol. 18, No. 11, Nov. 2000, pp. 1528-1532.

U.S. Appl. No. 09/947,306, filed Sep. 5, 2001, SP01/257.

* cited by examiner

METHODS AND APPARATUS FOR FORMING HEAT TREATED OPTICAL FIBER

RELATED APPLICATIONS

The present invention is a continuation-in-part application that claims priority to, and the benefit of, U.S. patent application Ser. No. 10/136,697 filed Apr. 30, 2002.

FIELD OF THE INVENTION

The present invention relates to methods and apparatus for forming optical fiber and, more particularly, to methods and apparatus for forming optical fiber having improved characteristics.

BACKGROUND OF THE INVENTION

Attenuation and sensitivity to heat (or thermal) aging may be critical attributes of optical fibers, particularly for high data rate optical fibers. In making optical fibers, it may be necessary or desirable to minimize attenuation loss in the intended window of operation for the fiber. Attenuation in an optical fiber can increase after fabrication of the fiber because of a phenomenon called "heat aging." Heat aging is the tendency of some optical fibers to increase in attenuation over time following formation of the fibers due to temperature fluctuations in the fiber's environment. Typically, the attenuation change from heat aging may be apparent at approximately 1200 nanometers (nm) with increasing effect up to about 1700 nm in a spectral attenuation plot. Furthermore, attenuation may be the result of Rayleigh scattering loss. Therefore, improved methods that reduce fiber attenuation due to heat aging and Rayleigh scattering are desired.

SUMMARY OF THE INVENTION

Embodiments of the present invention provide methods and apparatus for forming an optical fiber, such as a doped optical fiber. As optical fiber is drawn from an optical fiber preform at certain draw speeds and draw tensions, undesirable defects such as heat aging defects are induced into the optical fiber. Likewise, certain draw conditions produce more micro-scale density variations that lead to increased Rayleigh scattering. To combat these defects, the optical fiber is treated in accordance with the invention by maintaining the optical fiber within a treatment temperature range for a treatment time. In particular, it is desired to subject the optical fiber, as drawn, to a specified cooling rate. The phenomena of heat aging is best minimized by performing slowed cooling, preferably, while maintaining the optical fiber within a treatment tension range. Likewise, the phenomena of Rayleigh back scattering is reduced by subjecting the fiber to a specified cooling rate. Thus, advantageously, the invention herein reduces the tendency of the optical fiber to increase in attenuation over time following formation of the optical fiber, i.e., it reduces the so-called heat aging effect. Further, the invention herein further decreases the micro-density variations that contribute to Rayleigh scattering and therefore reduces the attenuation of the optical fiber.

The glass preform, and thus the optical fiber, may be doped with a dopant selected from the group consisting of germanium, fluorine, phosphorous, chlorine or combinations thereof. In particular, certain fiber refractive index profiles are found by the inventors to be more susceptible to heat aging, for example, fibers with high amounts of dopants are found to be very susceptible. All refractive index profiles exhibit attenuation from Rayleigh scattering.

In the various embodiments, the optical fiber is drawn from a draw furnace apparatus. In one embodiment, the drawn optical fiber is passed through a treatment furnace. The treatment furnace is preferably disposed substantially immediately downstream from the draw furnace. Most preferably, the treatment furnace is attached directly to the end of the draw furnace at a location where the fiber exits therefrom such that a seal is preferably formed therebetween. This minimizes unwanted entry of air into the draw furnace.

In further embodiments, the optical fiber is drawn from a draw furnace such that the drawn fiber is initially surrounded by a first gas. The drawn optical fiber may be treated by passing the drawn optical fiber through a passage or chamber of a passive muffle (lacking an active heating element). The passage or chamber preferably contains a second gas having a lower thermal conductivity than the first gas. Preferably, the gases mix and are discharged out of the end of the passive muffle.

According to one embodiment of the invention, the cooling rate of the fiber within the chamber containing the second gas is controlled thereby minimizing the induced heat aging effect. It has been found that a cooling rate of between 840° C./s and 4000° C./s between the temperature range of between about 1100° C. to about 1500° C. is desirable for controlling heat aging of the fiber.

According to other embodiments of the present invention, methods are provided for treating an optical fiber following being drawn. In particular, the treatment advantageously reduces the heat aging effect where the fiber has been formed under such conditions where attenuation thereof tends to increase over time following optical fiber formation. The optical fiber is treated by maintaining the optical fiber within a treatment temperature range for a treatment time while maintaining the optical fiber within a treatment tension range to reduce the tendency of the optical fiber to increase its attenuation over time following formation of the optical fiber.

According to further embodiments of the present invention, apparatus are provided for manufacturing an optical fiber having reduced heat aging defect. In one embodiment, a draw furnace contains a doped glass preform from which the optical fiber can be drawn at a draw speed and a draw tension sufficient to introduce a heat aging defect in the optical fiber. A treatment device is positioned downstream of the draw furnace. The treatment device is operative to treat the optical fiber by maintaining the optical fiber within a treatment temperature range for a treatment time while maintaining the optical fiber within a treatment tension range to reduce the tendency of the optical fiber to increase in attenuation over time after the optical fiber has been formed.

According to further embodiments of the present invention, apparatus are provided for forming and treating an optical fiber. A draw furnace includes an exit wall and is adapted to form the optical fiber such that the optical fiber exits the draw furnace at the exit wall. A treatment furnace is secured to the draw furnace housing adjacent the exit wall and defines a passage therein. The treatment furnace is configured and positioned such that the optical fiber enters the passage as it exits the draw furnace. Preferably, the passage and all passages through which the fiber passes have a minimum dimension of 12 mm such that the gob may drop therethrough.

According to further embodiments of the present invention, apparatus are provided for forming and treating an optical fiber. A draw furnace includes an exit wall and is adapted to form the optical fiber such that the optical fiber exits the draw furnace and the exit wall. The draw furnace contains a first gas, such as Helium, for example. A passive muffle (see definition below) is disposed adjacent the draw furnace and defines a passage. The passage contains a second gas having a lower thermal conductivity than the first gas, such as Argon, for example. The passive muffle is joined to the exit wall such that ambient air cannot enter the draw furnace or the passive muffle at the joinder therebetween. The first and second gasses mix in the passive muffle and exit at an end thereof.

According to further embodiments of the invention, a method of manufacturing an optical fiber at high speed is provided that comprises the steps of drawing the optical fiber from a heated glass supply, such as optical fiber preform, at a draw rate of greater than or equal to 10 m/s, followed by heat treating the optical fiber by maintaining the optical fiber in a heated treatment zone for a residence time greater than 0.07 seconds and less than 0.25 seconds while subjecting the optical fiber to an average cooling rate in the heated treatment zone of greater than 1,200° C./s and less than 5,000° C./s.

According to further embodiments of the invention, a method of manufacturing an optical fiber is provided that comprises the steps of providing a heated glass preform having a germainia-doped central core region and a substantially pure silica cladding region, drawing the optical fiber from a heated glass preform at a draw rate of greater than or equal to 15 m/s and at a draw tension between 25 and 200 grams, and heat treating the optical fiber in a heated treatment zone having an atmosphere containing helium flowing at greater than 10 liters/minute, and having an entry temperature of the optical fiber into the heated treatment zone is greater than 1,600° C., an exit temperature of the optical fiber from the heated treatment zone between 1,300° C. and 1,400° C., and the optical fiber is maintained in the heated treatment zone for a total residence time of greater than 0.07 and less than 0.15 seconds while controlling an average cooling rate of the optical fiber in the heated treatment zone to be greater than 2,000° C./s and less than 3,500° C./s.

Further features and advantages of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers used herein refer to like elements throughout. In the figures, layers, components or regions may be exaggerated for clarity.

The present invention includes methods for treating and for forming and treating drawn optical fibers to reduce the heat aging sensitivity (defects) of the treated optical fibers. As used herein, "heat aging" means a defect in the optical fiber that causes attenuation in the fiber to increase over time subsequent to the initial formation of the fiber. As will be better understood from the description that follows, the methods and apparatus of the present invention may allow for relatively high speed, high tension formation of drawn, doped, optical glass fibers having reduced heat aging sensitivity as compared to like fibers which have been drawn at such speeds and tensions but without the treatment step of the present invention.

Figure 1:
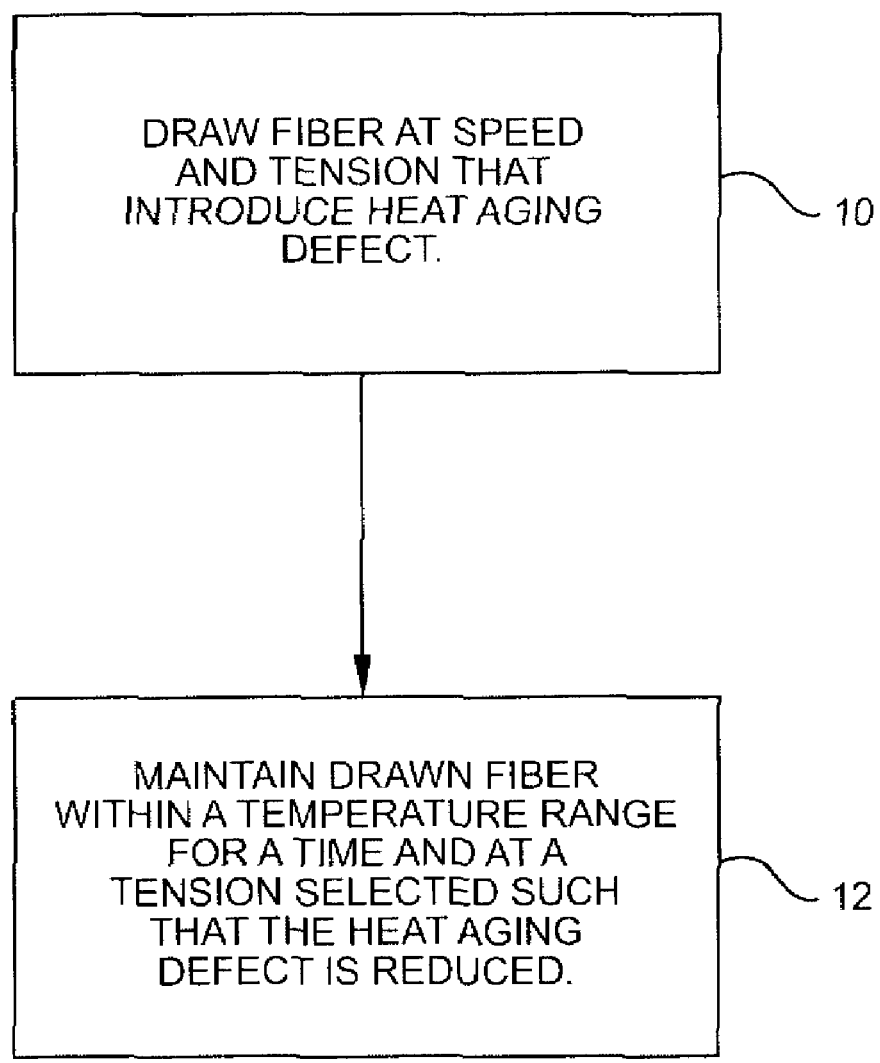
FIG. 1 is a block diagram illustrating methods, according to embodiments of the present invention, for manufacturing optical fiber.
Figure 5:
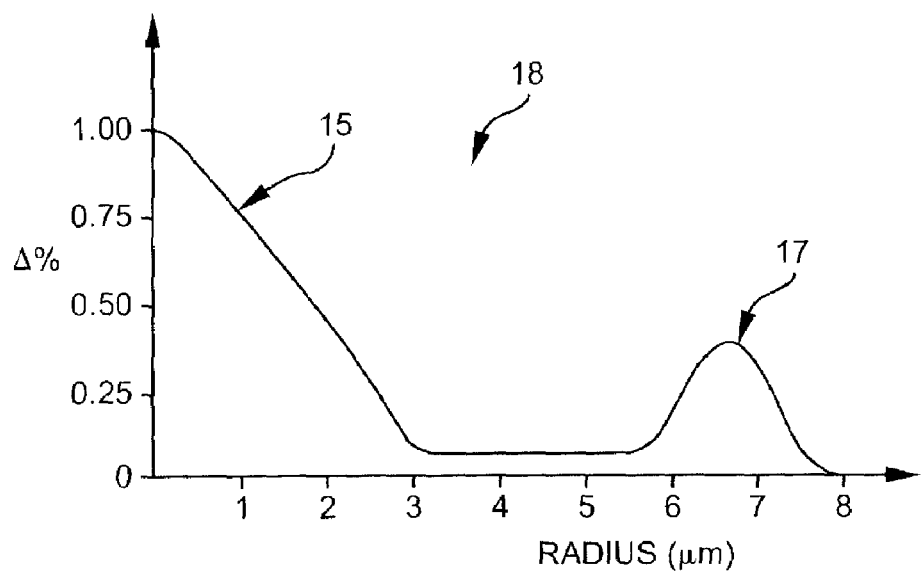
FIGS. 5–7 are refractive index plots of delta (%) versus radius (μm) of several optical fibers formed according to the present invention.
Figure 6:
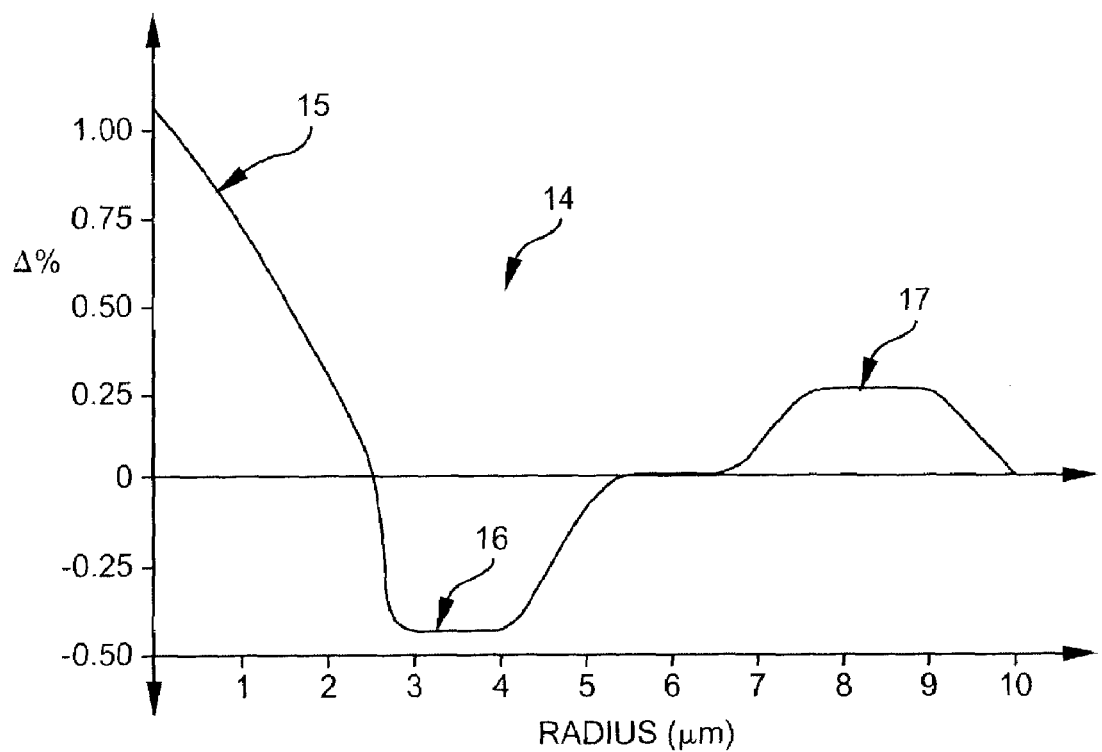
Figure 7:
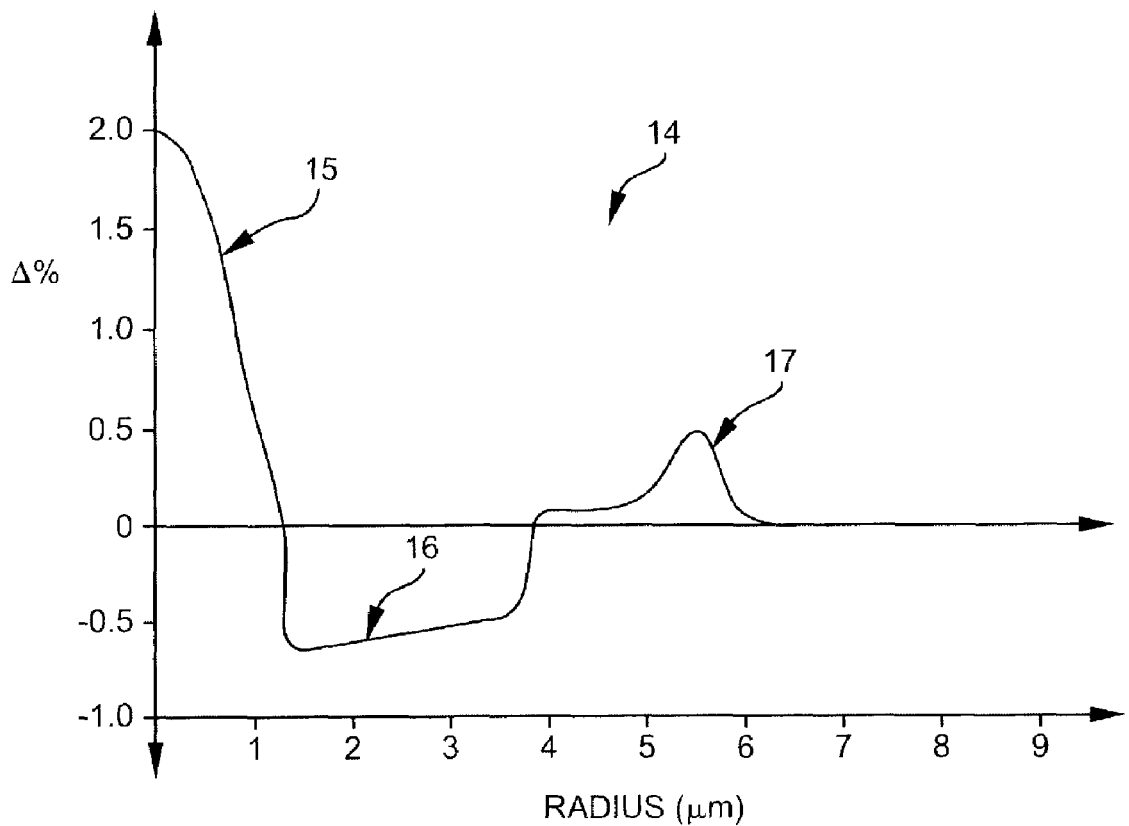

With reference to FIG. 1, in accordance with method embodiments of the present invention, an optical fiber is drawn, for example, from a suitable doped glass blank or preform, at a selected speed $S_D$ and a selected tension $F_D$ that is sufficient to introduce a heat aging defect in the drawn optical fiber (Block 10). Either or both of the core and the cladding (if any) of the drawn fiber may be doped. Typically, the core is doped and may include multiple segments therein, i.e., include a segmented core structure. FIGS. 5–7 illustrate delta (%) versus radius (μm) for several fiber refractive index profiles that appear to be sensitive to heat aging and which benefit from being formed and treated in accordance with the present invention. The draw speed $S_D$ is preferably maintained between about 2 m/s and 35 m/s during draw. More preferably, the draw speed $S_D$ is between about 6 m/s and 25 m/s. Draw speeds $S_D$ of greater than about 6 m/s induce some defect for most Dispersion Compensating (DC) fibers, for example, although, in some fibers, the defect may occur for draw speeds as low as 2 m/s or more. The draw tension $F_D$ is preferably in the range of between about 25 grams and 200 grams, and more preferably, in the range of between about 90 grams and 200 grams. It has been found that heat aging is typically induced in doped fibers, such as DC fibers, that are drawn at a draw speed of greater than about 6 m/s while being maintained at a draw tension of greater than 90 grams.

It should be noted that in some cases, it is possible to decrease the heat aging effect by operating with different draw conditions, such as operating at a lower draw speed or at a higher draw tension. However, some of these conditions are undesirable for either economic reasons or because the fiber attributes would be undesirable. The present invention allows the production of optical fiber more economically, and with better attributes such as strength, attenuation and uniformity while still producing an optical fiber with less attenuation increase due to heat aging in comparison to untreated optical fibers.

As is shown in FIGS. 6 and 7, such DC fibers 14 typically have a core including a central core 15, a moat 16 and a ring 17. The central core 15 and ring 16 typically include germania doping, while the moat typically includes fluorine doping. The delta values for the core 15 are typically greater than 0.8% and preferably range between about 0.8 to 3.0%, whereas the deltas of the rings 17 are typically greater than 0.2% and preferably range from between about 0.2 to 1.0% for such DC fibers 14. The deltas of the moats 16 are typically less than −0.2% and preferably range from between about −0.2 to −1.0%. Other fiber types, such as fiber 18 shown in FIG. 5 are also sensitive to heat aging and may include a core 15 and a ring 17.

The heat aging defect induced in the foregoing manner may be detected and measured by the following heat aging test method. First, the drawn fiber is cooled to about 20° C. and thereafter the fiber is heat cycled. The fiber is heat cycled by maintaining the drawn fiber at 200° C. for 20 hours and then cooling the fiber back to 20° C. The attenuation of the drawn fiber is thereafter measured (eg, using an optical bench such as a PK 2500 spectral bench available from Photon Kinetics or an Optical Time Domain Reflectometer (OTDR) apparatus) at the wavelength of interest (typically between 1000 nm–1700 nm). The fiber, when drawn (Block 10) and measured in this manner, exhibits an attenuation in the wavelength of interest that is increased by at least 0.03 dB/km to 0.25 dB/km or more in the heat cycled fiber as compared to the cooled fiber prior to heat cycling (un-heat aged fiber) when measured at 1550 nm. Thus, it should be recognized that it is highly desirable to reduce the heat aging effect by treating the fiber in accordance with the invention thereby minimizing any undesirable increase in attenuation.

In order to combat the aforementioned heat aging defect, the temperature $T_T$ of the drawn fiber is maintained within a selected temperature range $T_1$ to $T_2$ for a selected time $t_T$ and preferably at a selected tension $F_T$ (Block 12). Typically, the draw tension $F_D$ is the same as the treatment tension $F_T$. In this manner, the heat aging defect present in the drawn fiber prior to the treatment step may be reduced significantly or may even be effectively eliminated.

The foregoing method may be better appreciated from the more detailed description that follows. Suitable and preferred materials and parameters for executing the foregoing steps are set forth below. Additionally, apparatus according to the present invention for conducting the foregoing and other methods are described hereinbelow.

Figure 2:
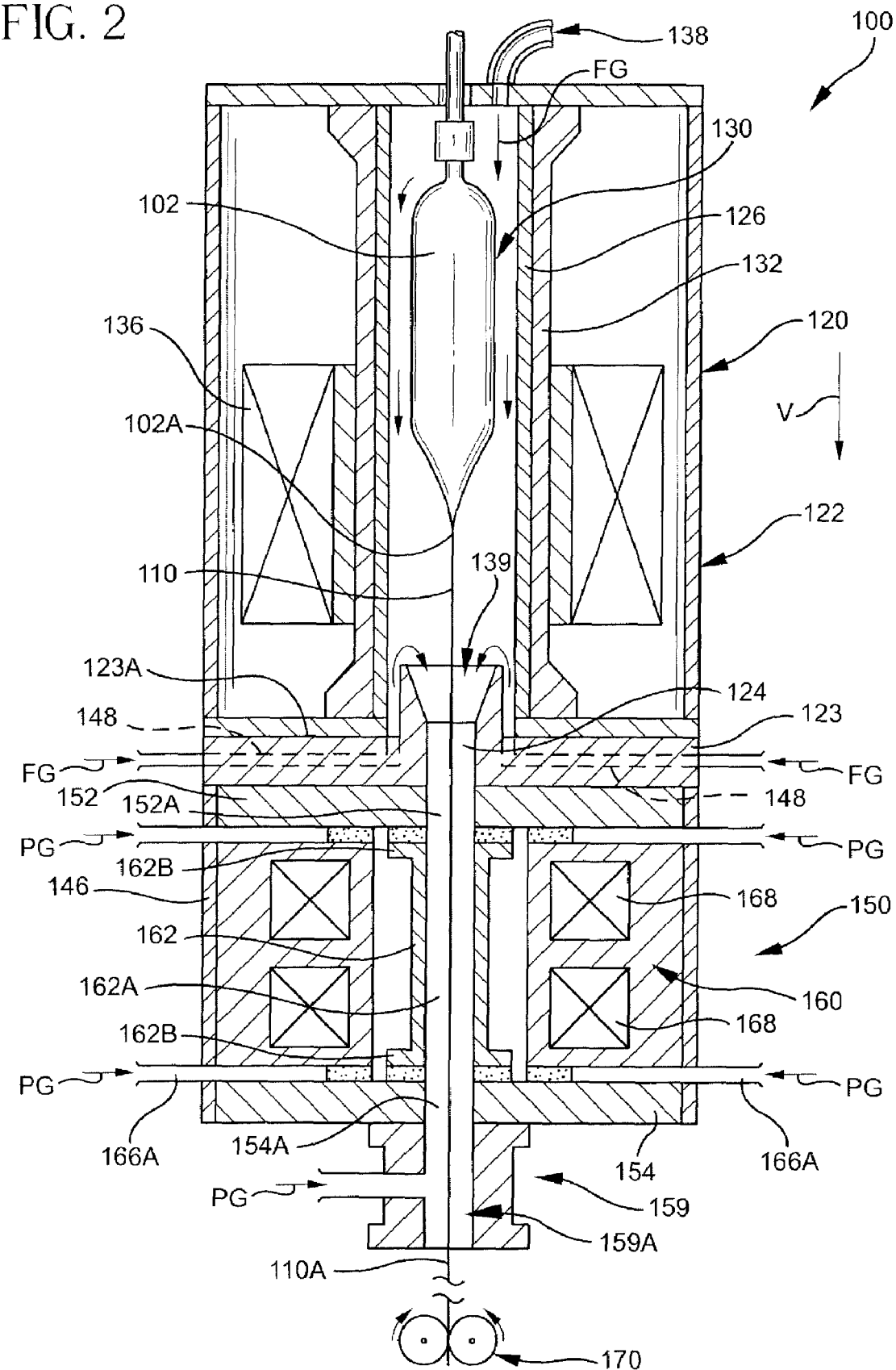
FIG. 2 is a schematic, cross-sectional side view of an optical fiber forming apparatus according to embodiments of the present invention.

With reference to FIG. 2, an optical fiber forming apparatus 100 according to embodiments of the present invention is shown therein. The apparatus 100 includes, generally, a draw furnace 120, a treatment furnace 150 and a tensioning station 170, shown as a tractor assembly, for applying tension to the drawn fiber. The apparatus 100 may be used to form a treated optical fiber 110A from a doped glass preform 102, for example. More particularly, the draw furnace 120 may be used to form a drawn optical fiber strand 110 (hereinafter "the drawn fiber 110") and the treatment furnace 150 may thereafter be used to treat the drawn fiber 110 to form a treated optical fiber strand 110A (hereinafter "the treated fiber 110A"). The treated optical fiber 110A being treated so as to minimize the heat aging effect. The tensioning station 170 serves to control and maintain the desired tension in the fiber 110, 111A. Additional conventional process steps may be included, such as non-contact diameter measurement apparatus, further fiber cooling apparatus, fiber coating and curing apparatus for applying and curing the primary and secondary fiber coatings, and spool winding apparatus. Such additional process steps are conventional and not shown for clarity. Additionally, an iris or moveable door mechanism may be employed at the bottom of the treatment furnace to minimize the amount of air entry into the treatment furnace.

The glass preform 102 is preferably formed of a doped silica glass. The preform 102 may be formed such that either the core or the cladding (if present) of the drawn fiber is doped, or such that both the core and the cladding of the drawn fiber are doped. The silica glass may be doped with one or more of germanium, fluorine, phosphorous or chlorine, or combinations thereof, for example. Other suitable dopants may be used as well. Germanium doped fibers, such as shown in FIGS. 5–7, were found by the inventors to exhibit heat aging under most manufacturing conditions. Methods and apparatus for forming the preform 102 are well known and are readily appreciated by those of skill in the art. Such methods include IVD, VAD, MCVD, OVD, PCVD and the like.

The draw furnace 120 preferably includes a housing 122 surrounding the preform and having a flange 123 secured on the lower end thereof, the flange 123 serving as the exit wall of the draw furnace 120. An axial opening 124 is defined in the flange 123 through which the fiber 110 passes and through which the previously dropped glass gob may pass. An annular sleeve-like susceptor 126 (which may be, for example, formed of graphite) extends through the draw furnace 120 and defines a passage 130 therein. The passage 130 includes an upper section adapted to receive and hold the optical fiber preform 102 and a lower section through which the drawn fiber 110 passes as glass is melted and drawn off from the preform 102. The gob, formed at the initiation of drawing also passes through this section. The lower section of the passage 130 communicates with the opening 124. A hollow exit cone 139 is preferably positioned over the opening 124. An annular insulator 132 and an induction coil(s) 136 surround the susceptor 126.

A suitable inert forming gas FG, most preferably helium, is introduced into the passage 130 at about 1 atmosphere of pressure through a suitable flow inlet 138 and flows downwardly and out of the draw furnace 120 through the opening 124. The draw furnace 120, as described and illustrated, is merely exemplary of suitable draw furnaces and it will be appreciated by those of skill in the art that draw furnaces of other designs and constructions, for example, using other types of heating mechanisms, susceptors and insulation, etc. may be employed.

With reference again to FIG. 2, opposed flow passages 148 extend radially through the flange 123 and terminate in openings at the upper surface 123A thereof. The passages 148 also extend vertically through the flange 123 and terminate adjacent the outer periphery of the cone 139. Forming gas FG is additionally fed through the openings of the passages 148 and flows up around the cone 139 and back down through the center opening of the cone 139. The forming gas FG may be, for example, helium gas (He), nitrogen gas ($N_2$), Argon gas (Ar), or any other suitable inert gas. Most preferably, the forming gas FG is helium gas.

The treatment furnace 150 is positioned below, and preferably interconnected to, the flange 123. The treatment furnace 150 includes a heating unit 160 with one or more annular heating elements 168 therein. The heating element may be, for example, an electrical resistance or an induction heating coil. Openings 152A and 154A are defined in the upper and lower ends of treatment furnace 152 and 154, respectively. The openings along the draw path are sufficiently large to enable the glass gob to drop through upon initiation of draw. The ends 152, 154 and the sleeve 146 serve as the housing for the treatment furnace 150. However, it will be appreciated that other housing configurations and components may be employed. The treatment furnace 150 is preferably secured to flange 123 of the draw furnace 120 by suitable means such as fasteners.

A generally cylindrical quartz spool 162 is disposed in the heating unit 160. The spool 162 defines a passage 162A and has a pair of quartz flanges 162B located on opposed ends thereof. The flanges 162B may be, for example, flame welded to the ends of a quartz tube to form the spool 162. A first graphite gasket 164 is interposed between the lower surface of the flange 152 and the upper flange 162B. A second graphite gasket 164 is interposed between the lower flange 154 and the lower flange 162B.

Gas rings 166 having feed passages 166A surround the graphite gaskets 164 and have small perforations adapted to direct a purge gas PG toward the graphite gaskets 164. The purge gas PG is provided to reduce or prevent exposure of the graphite gaskets 164 to air and may be, for example, helium (He), Argon (Ar), nitrogen ($N_2$), or any other suitable inert gas.

A purge gas member 159 is affixed to the lower surface of the flange 154. A purge gas PG is pumped into the purge tube passage 159A to prevent air from entering the passage 162A from below.

The passage 162A of the quartz tube 162 preferably has a diameter dimension D of greater than 12 mm at all places along its length, and preferably between about 12 mm and 80 mm, and more preferably between 45 mm and 80 mm to allow the glass gob formed at the initiation of drawing to readily drop therethrough. The length L of the treatment zone of the treatment furnace 150 extending between the upper surface of the flange 152 and the lower surface of the flange 154 is preferably between about 0.2 m and 3 m, and more preferably between 0.5 m and 1.0 m. The preferred length L will depend on the draw speed of the fiber 110 and the preferred ranges above are for a draw speed of from about 2 m/s to 35 m/s, and more preferably between 6 m/s and 25 m/s.

The tensioning station 170 may be any suitable device for controlling the tension in the drawn fiber 110. Preferably, the tensioning device 170 includes a microprocessor which continuously receives input from one or more fiber tension and/or diameter sensors (not shown) and is operative to apply the tension of the fiber 110 as needed. In a preferred embodiment, the tension commanded is based upon controlling the diameter to equal a set diameter stored in memory.

The apparatus 100 may be used in the following manner to manufacture a treated optical fiber 110A. The furnace induction coil 136 is operated to heat the tip 102A of the optical fiber preform 102 to a preselected draw temperature $T_D$. Preferably, the draw temperature $T_D$ is in the range of between about 1800° C. and 2200° C. More preferably, the draw temperature $T_D$ is in the range of between about 1900° C. and 2050° C. The preform tip 102A is maintained at the selected draw temperature $T_D$ so that the drawn fiber 110 is continuously drawn off of the tip 102A in a draw direction V, which is preferably vertically downward. The fiber 110 is maintained at a calculated draw tension $F_D$ as described above by the tensioning device 170 or other suitable tension applying apparatus such that the set diameter (typically 125 μm) of the fiber is met within a predefined tolerance band. The forming gas FG (e.g., helium) is pumped from the upper inlet 138 and through the passages 130, 124, 152A, 162A, 154A and out through the purge tube passage 159A.

In this way, the drawn fiber 110 is drawn off from the preform 102 at a selected draw speed $S_D$ as described above. The selected draw temperature $T_D$ and the draw tension $F_D$ used to manufacture the fiber causes the fiber 110 to have the undesirable heat aging defect. That is, as a result of the draw temperature $T_D$ and the draw tension $F_D$ used to draw the fiber 110 at the desired speed $S_D$, the drawn fiber 110 will exhibit a sensitivity to heat aging.

Because the treatment device 150 is secured substantially immediately adjacent the opening 124 of the draw furnace 120, the drawn fiber 110 is not quenched by cooler ambient air as the fiber 110 exits the draw furnace 120. Further, the possibility of oxygen getting into the draw furnace is reduced, thereby minimizing possible degradation of the graphite susceptor 126. In the present invention, the drawn fiber 110 passes through the passage 124 and is substantially immediately heated by the heating unit 160. The heating unit 160 maintains the temperature of the fiber 110 at a treatment temperature $T_T$ within a selected temperature range $T_1$ to $T_2$. The lower temperature $T_1$ is preferably between about 1100° C. and 1400° C. and the upper temperature $T_2$ is preferably between about 1200° C. and 1800° C. More preferably, the lower temperature $T_T$ is between about 1200° C. and 1350° C. and the upper temperature $T_2$ is between about 1300° C. and 1450° C. Also, as the fiber 110 passes through the passage 162A, the fiber 110 is maintained at a selected treatment tension $F_T$. Preferably, the treatment tension $F_T$ is between about 25 and 200 grams. More preferably, the treatment tension $F_T$ is between about 90 and 170 grams. The length L of the treatment zone is selected such that the drawn fiber 110 is maintained within the selected temperature range $T_1$ to $T_2$ for a selected resident treatment time $t_T$. The treated fiber 110A exits the treatment furnace 150 through the bottom opening 154A and preferably continues downwardly to additional processing stations (additional cooling, measurement, coating, etc.).

The above-described treatment temperature $T_T$, treatment tension $F_T$ and resident time $t_T$ are cooperatively selected to reduce or eliminate the heat aging defect or sensitivity in the fiber 110. Accordingly, the treated fiber 110A so formed will have a lesser heat aging defect or sensitivity as compared to an optical fiber 110 which has not been suitably treated in the manner described above (i.e., using the step of Block 12 in FIG. 1), but which has otherwise been formed in the same manner. The foregoing methods and apparatus thus allow for relatively high speed drawing of optical fiber with reduced heat aging defects as compared to untreated fibers drawn at the same speed.

Preferably, the draw furnace 120 and the treatment furnace 150 are relatively configured and secured and the gases are supplied such that they provide an air-tight path from the passage 130 to the opening 159A.

Figure 3:
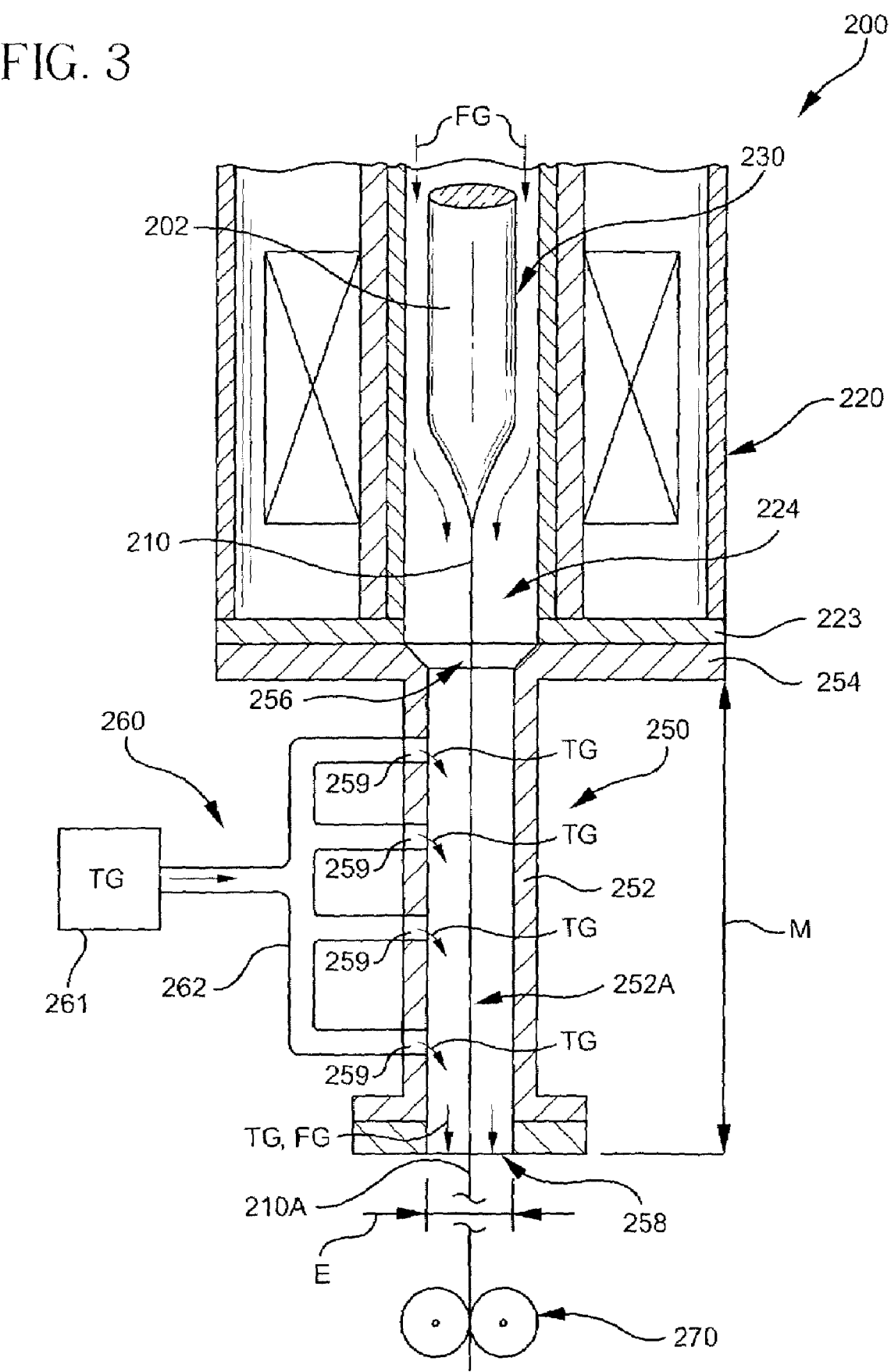
FIG. 3 is a schematic, cross-sectional side view of an optical fiber forming apparatus according to further embodiments of the present invention.

With reference to FIG. 3, an optical fiber forming apparatus 200 according to further embodiments of the present invention is shown. The apparatus 200 includes a draw furnace 220 corresponding to the draw furnace 120. In place of the treatment furnace 150, the apparatus 200 includes a passive treatment assembly 250. The assembly 250 is "passive" in that it does not include a heating device corresponding to the heating module 160 in any portion thereof. In other words, the fiber is cooled at a controlled rate without the aid of an active heating module.

The apparatus 200 includes a draw furnace 220 and a tensioning station 270 corresponding to the draw furnace 120 and the tensioning station 170, respectively. Preferably, the draw furnace 220 is of the type having a graphite susceptor. The passive treatment assembly 250 includes a tubular muffle 252 having an upper flange 254. The muffle 252 is affixed directly to the lower end wall 223 of the furnace 220 by bolts or other fasteners (not shown for clarity) that extend through holes in the flange 254 and engage the end wall 223. The muffle 252 is preferably formed of metal, such as stainless steel or aluminum.

The muffle 252 defines an upper opening 256 at a first end, an opposing lower opening 258 at a second end and a passage 252A extending therebetween. Preferably, the diameter E of the passage 252A is substantially uniform and greater than 12 mm, more preferably between about 12 mm and 80 mm, and most preferably between 45 and 80 mm. The upper opening 256 communicates with the lower opening 224 of the draw furnace 220. A plurality of axially spaced supply ports 259 are formed in the side wall of the muffle 252 and communicate with the passage 252A along its length.

A treatment gas flow system 260 is operatively and fluidly connected to the muffle 252. The treatment gas flow system 260 includes a treatment gas supply 261 that is fluidly and operatively connected to each of the ports 259 by a manifold or conduits 262. The treatment gas supply station 262 includes a supply of a selected treatment gas TG, and a pump or the like operative to pressurize the treatment gas TG sufficiently to force it through the conduits 262 and the feed ports 259 and into the passage 252A. The treatment gas supply station 261 may optionally include a heating unit to heat the treatment gas TG. However, preferably the treatment gas is supplied at 20° C.

The apparatus 200 may be used in the following manner to form a treated optical fiber 210A. Using the draw furnace 220 and the tensioning device 270, a fiber 210 corresponding to the fiber 110 is drawn from a preform 202 corresponding to the preform 102 in the manner described above with regard to the apparatus 100, at a draw temperature and a draw tension sufficient to introduce a heat aging defect. As the fiber 110 is being drawn, a forming gas FG is introduced through an inlet identical to that shown in FIG. 2. The forming gas flows through the passage 230 about the preform 202 and the fiber 210, through the opening 224 in the furnace end wall 223 and into the first end of the passage 252A through the opening 256.

The drawn fiber 210 enters the passage 252A of the muffle 252 immediately upon exiting the furnace 220. As the fiber 210 passes through the passage 252A, the treatment gas TG is pumped from the treatment gas supply 261 into the passage 252A through the at least two axially spaced supply ports 259 as indicated by the arrows in FIG. 3. The treatment gas flows into the passage 252A at the various stages and mixes with the forming gas FG. Preferably, the treatment gas TG has a thermal conductivity k of less than about $120 \times 10^{-6}$ cal/(sec)(cm)$^2$ (° C./cm), and more preferably less than about $65 \times 10^{-6}$ cal/(sec)(cm)$^2$ (° C./cm) at 25° C. The mixture of the treatment gas TG and the forming gas FG flows through the passage 252A and exits through the second end opening 258.

The treatment gas TG has a lower thermal conductivity than the forming gas FG. Preferably, the thermal conductivity of the treatment gas TG is less than 40% of, and more preferably less than 20% of, the thermal conductivity of the forming gas FG. The treatment gas TG is preferably nitrogen or argon. More preferably, the treatment gas TG is argon. The forming gas FG is preferably helium.

As the drawn fiber 210 is drawn through passage 252A, the drawn fiber 210 is maintained at the selected treatment tension $F_T$, and the treatment temperature $T_T$ of the fiber 210 while in the passage 252A is maintained in the selected temperature range $T_1$–$T_2$ for the selected residence time $t_T$ as discussed above with respect to the apparatus 100. In the manner described above with respect to the apparatus 100, the selected treatment tension $F_T$, temperature range $T_1$ to $T_2$ and residence time $t_T$ are cooperatively selected such that they reduce or eliminate the heat aging defect in the fiber 210, thereby providing a treated fiber 210A corresponding to the treated fiber 110A. In the case of the apparatus 200, the length M of the passage 252A of the passive treatment device 250 is selected to provide the desired residence time $t_T$ in view of the draw speed of the fiber 210.

The lower thermal conductivity of the treatment gas TG slows heat transfer from or cooling of the drawn fiber 210 so that the fiber 210 is maintained in the selected temperature range $T_1$–$T_2$ while in the passage 252A. The flow rate, turbulence and temperature of the treatment gas TG may be selected as appropriate to provide the desired cooling rate. In accordance with this embodiment of the invention, the desired cooling rate in the treatment furnace 250 is between 2500° C./sec and 3500° C./sec in a temperature range of between 1200° C. to 1500° C.

Figure 4:
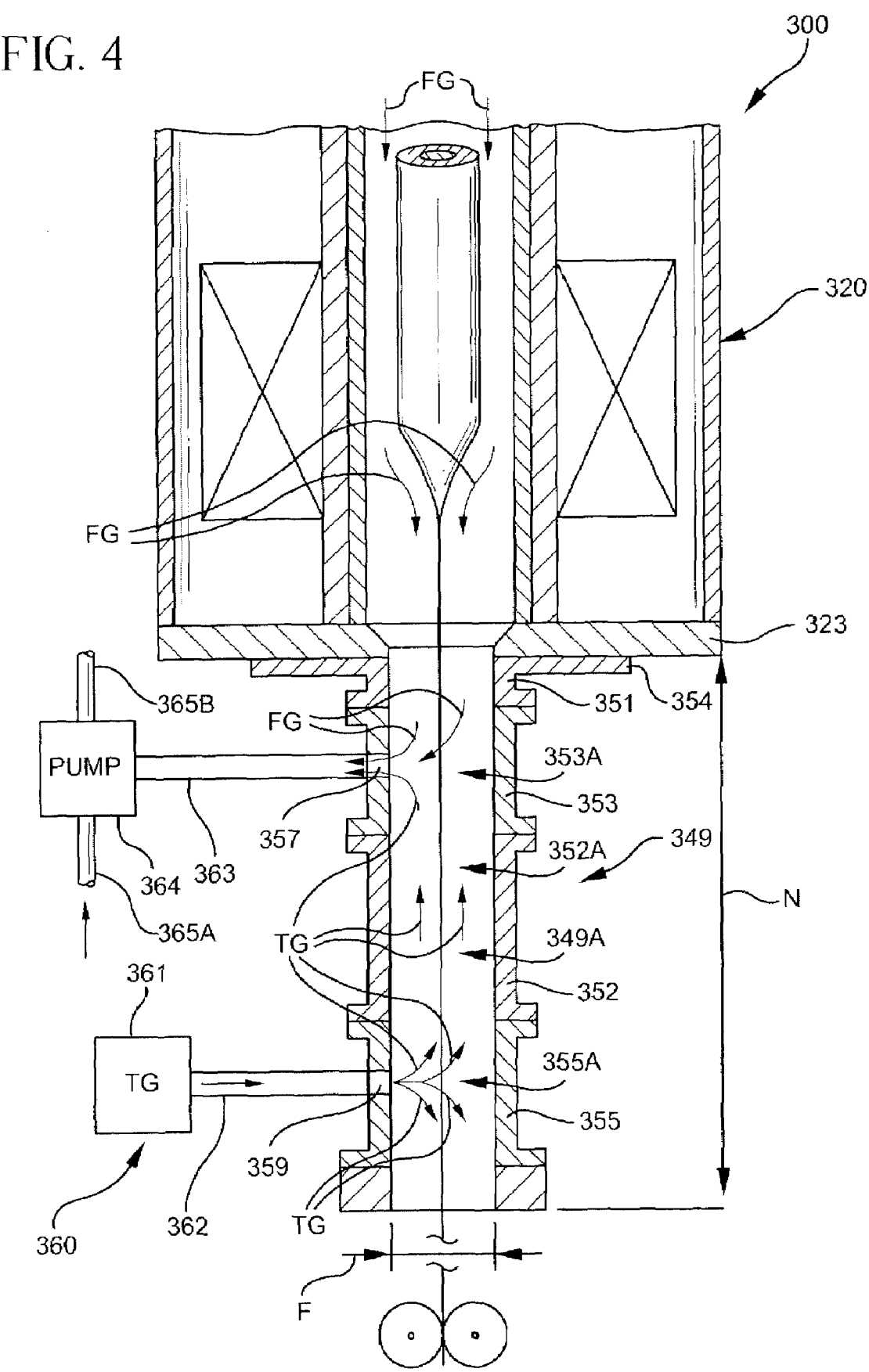
FIG. 4 is a schematic, cross-sectional side view of an optical fiber forming apparatus according to further embodiments of the present invention.

With reference to FIG. 4, an optical fiber forming apparatus 300 according to further embodiments of the present invention is shown therein. The apparatus 300 includes a draw furnace 320 of the type having a graphite susceptor. The apparatus 300 corresponds to the apparatus 200 except as follows and may be used in the same manner except as follows.

The muffle 250 is replaced with a multi-piece muffle assembly 349 defining a continuous passage 349A. The muffle assembly 349 includes an annular upper muffle section 351 including a flange 354 for securing the muffle assembly 349 to the exit wall 323 of the draw furnace 320. A second annular muffle section 353 is affixed to the lower end of the muffle section 351 and defines a passage 353A. An outlet port 357 is formed in the side of the muffle 353 and communicates with the passage 353A. A third annular muffle section 352 is affixed to the lower end of the muffle section 353 and defines a passage 352A. A fourth annular muffle section 355 is fixed to the lower end of the muffle section 352 and defines a passage 355A. A feed port 359 is formed in the muffle 355 and communicates with the passage 355A. The diameter F of the passage 349A is preferably substantially uniform and preferably greater than 12 mm, more preferably between about 12 mm and 80 mm, and most preferably between 45 and 80 mm and is preferably of substantially constant diameter along its length N. The length N of the muffle assembly 349 is preferably between about 0.2 m and 1.0 m.

Additionally, in the apparatus 300, the treatment gas flow apparatus 260 is replaced with a treatment gas flow system 360. The flow system 360 includes a treatment gas supply 361 corresponding to the treatment gas supply station 261. The treatment gas supply station 361 is fluidly connected to the feed port 359 by a conduit 362. The flow system 360 further includes a pump 364 fluidly connected to the outlet port 357 by a conduit 363. The pump 364 is preferably a Venturi pump that is provided with a supply of compressed air from inlet 365A as illustrated.

In use, the treatment gas TG is introduced from the treatment gas supply 361 through the conduit 362 and the feed port 359 into the passage 355A. The pump 364 provides a sufficient vacuum and resultantly draws at least a portion of the treatment gas TG up through the passages 352A and 353A, through the outlet port 357 and the conduit 363, and out through an outlet 365B. Simultaneously, the vacuum generated by the pump 364 draws the forming gas FG from the draw furnace 320 through the passage 353A, the outlet port 357 and the conduit 363, and out through the pump outlet 365B as well. This is beneficial, because it prevents the mixing of the two gasses in the lower end of the passage 349A.

EXAMPLE 1

Using a draw furnace, a negative dispersion germania-doped optical fiber having a profile including a core and a ring as shown in FIG. 5 was drawn from a doped preform at a rate of 14 meters per second (m/s) with a tension of 150 grams. Thereafter, the fiber was cooled to 20° C. and then subjected to the heat aging test as described above. Following this test, the measured attenuation increase in the untreated fiber at 1550 nm was 0.0830 dB/km.

A second fiber was drawn from an identical preform in the same manner as described just above. The second fiber was passed through a treatment apparatus in accordance with the invention as described in FIG. 4 immediately after the fiber exited the draw furnace. The length and operating parameters of the treatment furnace were selected such that the temperature of the second fiber was maintained at a desired temperature for a desired amount of time. In particular, the length M of passage was about 0.615 m. Thus, the fiber was maintained at a temperature of from about 1700° C. to about 1525° C. for a residence time of about 0.044 seconds while the tension in the fiber was maintained at 150 grams. The forming gas FG was helium and the treatment gas TG was argon at 23° C. Thereafter, the fiber was cooled to 20° C. and then subjected to the same heat aging testing as heretofore described. The measured attenuation in the fiber subjected to the treatment increased only 0.027 dB/km at 1550 nm. Thus, for this fiber type as shown in FIG. 5, a 67% reduction in the heat aging was obtained by subjecting the fiber to the additional treatment step in accordance with the invention.

EXAMPLE 2

Using a draw furnace, a negative dispersion germania and fluorine doped optical fiber having a profile including a core, moat and a ring as shown in FIG. 6 was drawn from a preform at a rate of 14 meters per second (m/s) with a tension of 150 grams. Thereafter, the fiber was cooled to 20° C. and then subjected to the heat aging test as described above. Then testing revealed that the measured attenuation increase in the fiber at 1550 nm was 0.285 dB/km following heating for 20 hours at 200° C.

A second fiber was drawn from an identical preform in the same manner as described just above. The second fiber was subjected to the treatment apparatus and method in accordance with the invention described in FIG. 4 herein immediately after the fiber exited the draw furnace. The length and operating parameters of the treatment furnace were selected such that the temperature of the second fiber was maintained at the conditions identified in Example 1. Thereafter, the fiber was cooled to 20° C. and then subjected to the same heat aging testing as heretofore described. The measured attenuation increase in the fiber subjected to the treatment was only about 0.033 dB/km at 1550 nm. Thus, for this fiber type, a dispersion compensating fiber having a positive delta core, a negative delta moat and a positive delta ring, it should be recognized that a dramatic reduction (88%) in the heat aging was obtained by subjecting the fiber to the additional treatment step. The cooling rate applied in the previous two examples was approximately 3980° C./s.

EXAMPLE 3

Using a draw furnace, a germania and fluorine doped silica glass optical fiber having a negative dispersion and dispersion slope and a profile as shown in FIG. 5 was drawn from a preform at a rate of 14 meters per second (m/s) with a tension of 150 grams. A helium forming gas was used in the draw furnace. Thereafter, the fiber was cooled to 20° C. and then subjected to the heat aging testing where the fiber is maintained at 200° C. for 20 hours. At the end of this period, the fiber was cooled to 20° C., the measured attenuation increase in the fiber at 1550 nm was 0.420 dB/km.

A second fiber was drawn in the same manner as described just above from an identical fiber. The second fiber was passed through a heated treatment apparatus as shown in FIG. 2 immediately after the fiber exited the draw furnace. The length of the muffle was 0.4 m and its inside diameter was 60 mm and the temperature was selected such that the temperature of the second fiber was maintained at from about 1700° C. to about 1525° C. for a residence time of about 0.028 seconds while the tension in the fiber was maintained at 150 grams. The second fiber was heat aging tested as before and the measured attenuation increase in the fiber at 1550 nm was 0.0015 dB/km. Thus, the present invention resulted in a 96% reduction in heat aging.

Other actual experimental examples are illustrated in Table 1. Listed are the Example Number (Ex.), the attenuation change with (With Treat) and without (W/O Treat) the heat aging reduction treatment, the % reduction in heat aging when treated (% Red.), the fiber profile (Prof.) of the fiber treated, the dopants present in the treated fiber (Dop.), the draw tension used (Tens.), the draw speed used (Draw Speed), the apparatus used (App.), and whether the apparatus included a heater (Heater).

Table 1 illustrates the results for the various example.

| Ex. | Gas | W/O Treat dB/km | With Treat dB/km | % Red. | Prof. | Dop. | Tens. grams | Draw Speed m/s | App. | Heater |
|---|---|---|---|---|---|---|---|---|---|---|
| 1 | Ar | 0.083 | 0.027 | 67% | FIG. 5 | Ge | 150 | 14 | FIG. 4 | No |
| 2 | Ar | 0.285 | 0.033 | 88% | FIG. 6 | Ge/F | 150 | 14 | FIG. 4 | No |
| 3 | He | 0.420 | 0.0015 | 96% | FIG. 7 | Ge/F | 150 | 14 | FIG. 2 | Yes |
| 4 | He | 0.032 | 0.0155 | 52% | FIG. 5 | Ge | 150 | 14 | FIG. 2 | Yes |
| 5 | He | 0.191 | 0.0175 | 91% | FIG. 6 | Ge/F | 150 | 14 | FIG. 2 | Yes |
| 6 | He | 0.560 | 0.050 | 91% | FIG. 7 | Ge/F | 150 | 20 | FIG. 2 | Yes |
| 7 | Ar | 0.141 | 0.066 | 53% | FIG. 5 | Ge | 150 | 20 | FIG. 3 | No |
| 8 | Ar | 0.135 | 0.054 | 60% | FIG. 5 | Ge | 150 | 17.5 | FIG. 3 | No |

-continued

| Ex. | Gas | W/O Treat dB/km | With Treat dB/km | % Red. | Prof. | Dop. | Tens. grams | Draw Speed m/s | App. | Heater |
|---|---|---|---|---|---|---|---|---|---|---|
| 9 | Ar | 0.108 | 0.059 | 45% | FIG. 5 | Ge | 150 | 15.0 | FIG. 3 | No |
| 10 | Ar | 0.082 | 0.052 | 36% | FIG. 5 | Ge | 150 | 12.5 | FIG. 3 | No |
| 11 | Ar | 0.649 | 0.294 | 55% | FIG. 6 | Ge/F | 90 | 15 | FIG. 4 | No |
| 12 | Ar | 0.458 | 0.101 | 78% | FIG. 6 | Ge/F | 150 | 20 | FIG. 4 | No |

Figure 9:
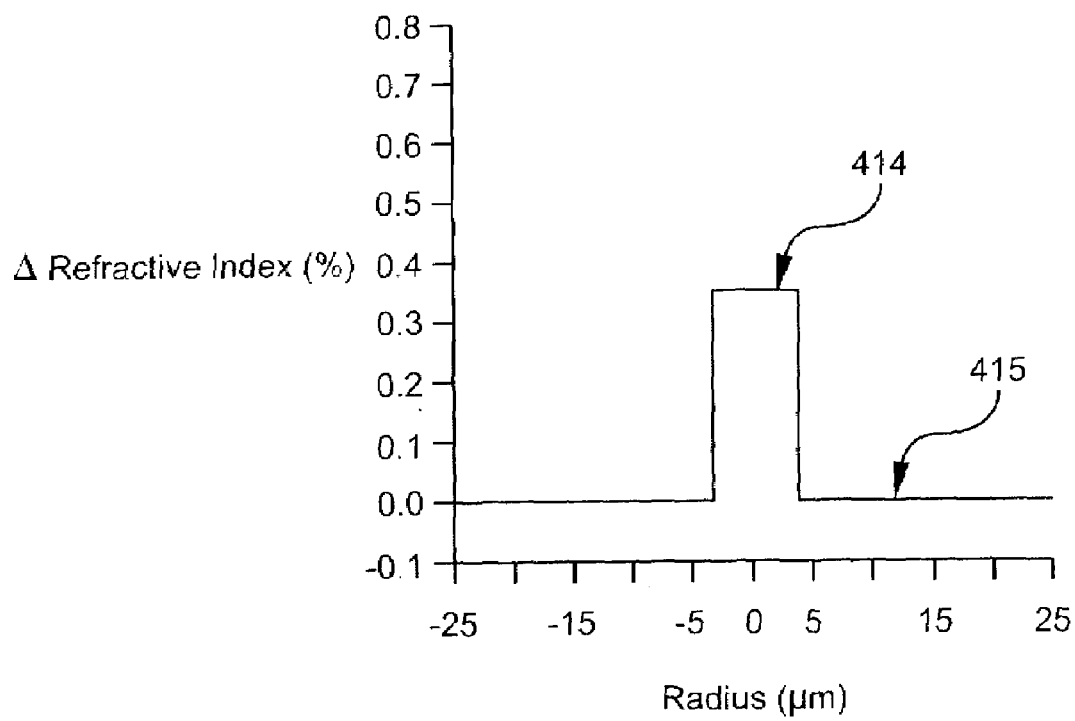
FIG. 9 is a graphic depiction of a refractive index profile of an optical fiber that may be heat treated according to embodiments of the present invention.
Figure 10:
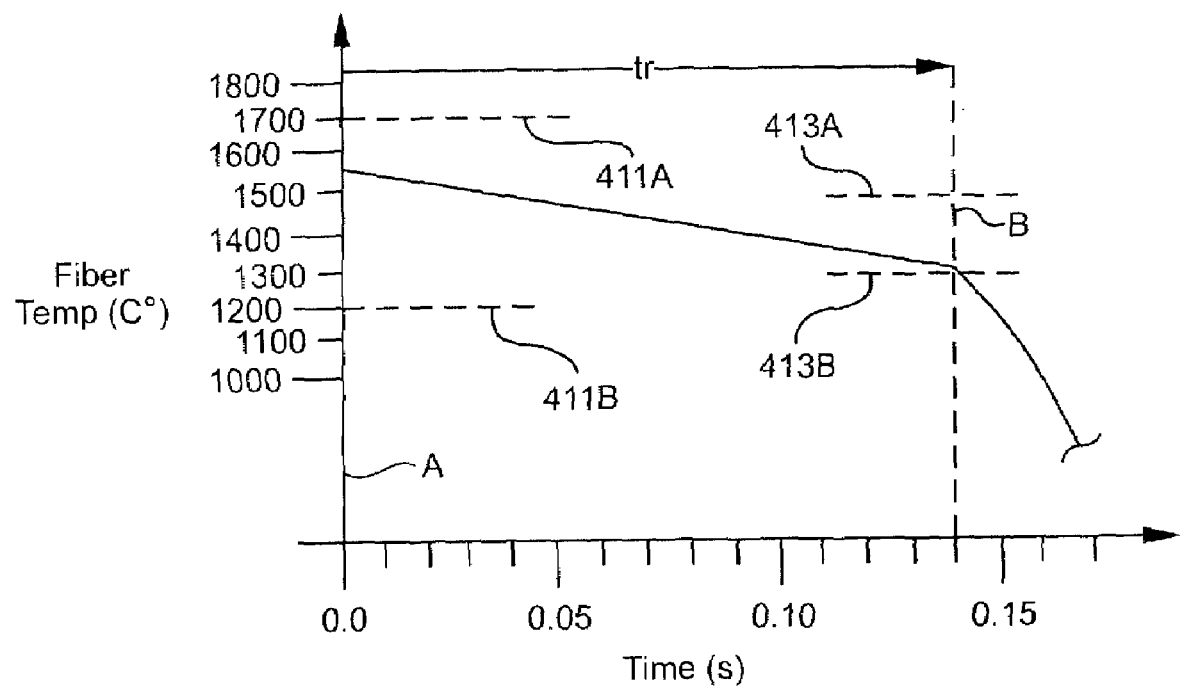
FIG. 10 is a graphic depiction of a cooling rate profile of the method according to embodiments of the present invention.
Figure 11:
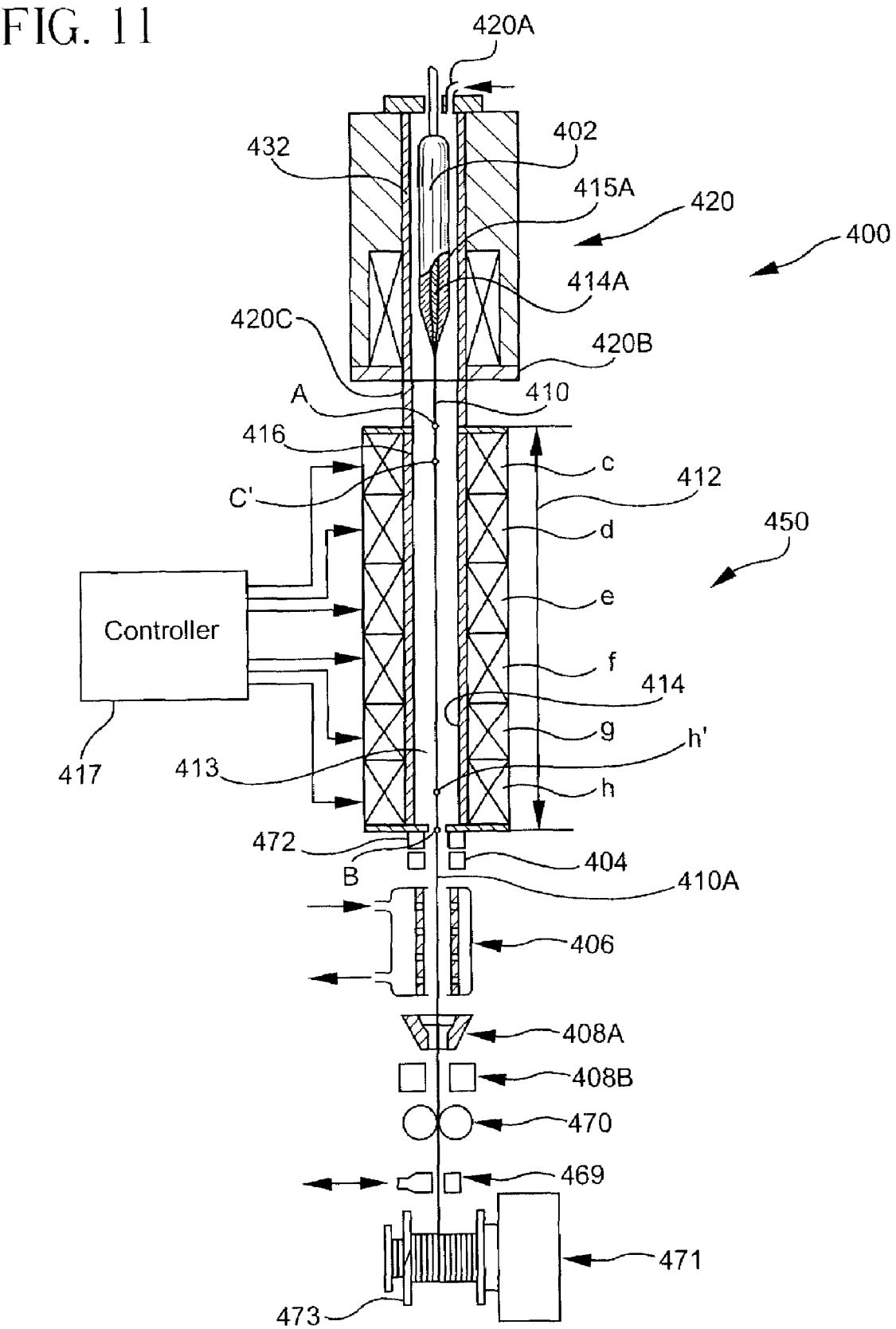
FIG. 11 is a schematic, cross-sectional side view of an optical fiber drawing and heat treating apparatus according to embodiments of the present invention.

Another embodiment of the invention is shown and described with reference to FIGS. 8–11. In accordance with this embodiment, a method for high speed drawing (at draw rates of greater than or equal to 10 m/s) and heat treatment of optical fiber is provided. As best shown in FIG. 11, a treated optical fiber is produced at high speed from an optical fiber forming apparatus 400 according to embodiments of the present invention. The apparatus 400 includes, generally, a draw furnace 420, followed downstream by, and preferably mechanically coupled to, a heat treatment furnace 450. The apparatus 400 may be used to form a heat treated optical fiber 410A by drawing it at high speed from a heated glass supply 402, such as a optical fiber preform for example, and then subjecting the drawn fiber to a defined temperature profile (a time-temperature profile, for example, as shown in FIG. 10) such that attenuation of the fiber due to Rayleigh Scattering is reduced. The method described herein is particularly effective at producing, at high speed, germanium-doped central core optical fibers having reduced attenuation due to reduced Rayleigh scattering loss. In particular, the method is well adapted to providing low attenuation (less than or equal to 0.187 dB/km at 1550 nm and/or less than or equal to 0.327 at 1310 nm) in optical fibers having germanium-doped central cores. One such fiber is a single mode step index fiber example as shown in FIG. 9 having a germanium-doped central core 414 and a substantially pure silica cladding 415 surrounding and abutting the core.

More particularly, the draw furnace 420 may be used to form a drawn optical fiber strand 410 (hereinafter "the drawn fiber 410") at high speed and the treatment furnace 450 may thereafter be used to heat treat the drawn fiber 410, thus formed at high speed, to produce a treated optical fiber strand 410A (hereinafter "the treated fiber 410A"). The treated optical fiber 410A is heat treated to preferably reduce the attenuation due to Rayleigh back scattering over an operating wavelength (with attenuation, for example, of less than or equal to 0.327 dB/km at 1310 nm, and preferably less than or equal to 0.187 dB/km at 1550 nm).

As should be recognized, additional apparatus may be included for performing subsequent conventional process steps after the heat treating step. For example, a non-contact diameter measurement apparatus 404 for measuring a representative diameter of the fiber may follow after the heat treatment step. Further, a fiber cooling apparatus 406 may be provided for even further cooling the treated fiber 410A to a sufficiently low temperature (for example, less than about 100° C.) to allow a protective polymer coating(s) to be applied to the outer periphery of the treated fiber 410A. A fiber coating apparatus 408A and curing apparatus 408B for applying and curing the primary polymer coating may also be provided. Furthermore, additional coating and curing apparatus may be provided for applying and curing a secondary polymer coating (not shown). Tensioning apparatus 470 are preferably provided for applying the desired draw tension to the fiber after it is coated. Finally, a spool winding apparatus 471 and reciprocating guide 469 may be provided for winding the heat treated and coated optical fiber onto a winding spool 473, such as a shipping or bulk spool. Additionally, an iris or moveable door mechanism 472 may be employed at the bottom of the treatment furnace 450 to minimize the amount of air entry into it from the exit.

In operation, the method in accordance with embodiments of the invention comprises the steps of drawing the optical fiber 410 from a heated glass supply, such as an optical fiber preform 402 (preferably including a germania-doped central core region and a substantially pure silica cladding region—corresponding to, and forming when drawn, an optical fiber having a germania-doped central core and a cladding of substantially pure silica), at a draw rate of greater than or equal to 10 m/s, followed by heat treating the optical fiber by maintaining the optical fiber in a heated treatment zone 412 for a residence time (preferably greater than 0.07 and less than 0.25 seconds) while subjecting the optical fiber 410 to an average cooling rate in the heated treatment zone 412 of greater than 1,200° C./s and less than 5,000° C./s; more preferably greater than 2,000° C./s and less than 5,000° C./s, and in some embodiments, greater than 2,000° C./s and less than 3,500° C./s. The average cooling rate is preferably greater than 2,000° C./s and less than 5,000° C./s, for example, when the draw speed is greater than or equal to 20 m/s. The average cooling rate in the heated treatment zone 412 is defined as the fiber surface temperature at the entry point "A" (the fiber entry surface temperature) of the fiber minus the fiber's surface temperature at an exit point "B" (the fiber exit surface temperature) of the fiber divided by the total residence time of the fiber in the treatment zone.

The method in accordance with embodiments of the invention is particularly well suited for reducing the attenuation due to Rayleigh scattering of an optical fiber 410, such as the standard step index single mode fiber shown in FIG. 9. The method is particularly well suited for manufacturing an optical fiber having a central core 414 at the fiber's centerline including a germanium dopant and a cladding 415 including substantially pure silica (with no appreciable refractive index altering dopants). As used herein, the term "central core" refers to the portion of the fiber where the majority of the light is confined when in operation, which is at the center part of the fiber, and which has a higher refractive index portion as compared to an outermost glass cladding portion. The cladding 415 is that part of the fiber 410 that surrounds and abuts the central core and which extends to the outside diameter of the glass portion of the fiber (to a diameter of about 125 microns) and which has a lower refractive index than the central core 414. As should be recognized, the heated glass source preform 402 also includes a core region 414A and a cladding region 415A (shown partially cut away in FIG. 11) whose physical proportions and composition roughly corresponds to the central core 414 and cladding 415 of the fiber drawn therefrom. In other words, the core region 414A is doped with at least germanium and the cladding region 415A is formed of substantially pure silica.

The method in accordance with embodiments of the invention will be further described with reference to FIGS. 10 and 11. FIG. 10 illustrates one preferred cooling profile for forming the heat treated optical fiber 410A in accordance with the invention. Preferably, after being drawn from the heated glass supply preform 402 (having a root portion heated to about 1800–2200° C.), the drawn fiber 410 enters into the treatment furnace 450 at time equals 0.0 seconds such that the fiber 410 has a fiber entry surface temperature preferably between an upper temperature 411A of 1700° C. and a lower temperature 411B of 1,200° C. at the point of entry into the treatment zone 412 of the furnace (designated "A"); more preferably between 1,550° C. and 1,700° C.; and in some embodiments greater than 1600° C. The fiber 410 is then heated and slow cooled in the treatment zone 412 and spends a sufficient total residence time tr in the treatment zone 412 (between 0.07 and 0.25 seconds) such that partial fiber annealing (slowed but non-equilibrium reordering of the glass on an atomic scale) takes place. The surface temperature of the fiber at the exit (designated "B") from the heat treatment zone is between an upper temperature 413A of 1,450° C. and a lower temperature 413B of 1,250° C. Annealing in accordance with the invention herein reduces the Rayleigh back scattering loss and, therefore, reduces the attenuation of the treated optical fiber 410A at the wavelengths of interest (e.g., 1310 nm and 1550 nm) as compared to untreated fiber.

As is shown in FIG. 11, the draw furnace 420 and treatment furnace 450 are preferably configured to form a continuously enclosed path for the optical fiber as it passes between the drawing and heat treating steps. For example, the treatment furnace 450 may mount directly to a lower flange 420B of the draw furnace 420 or attach to an interconnection member 420C such as tube shown. The fiber is disposed in an inert atmosphere and is free from air exposure while it passes between the draw furnace 420 and the treatment furnace 450. This advantageously minimizes air exposure to the graphite muffle tube 432 of the draw furnace 420 that may cause degradation thereof.

Figure 8:
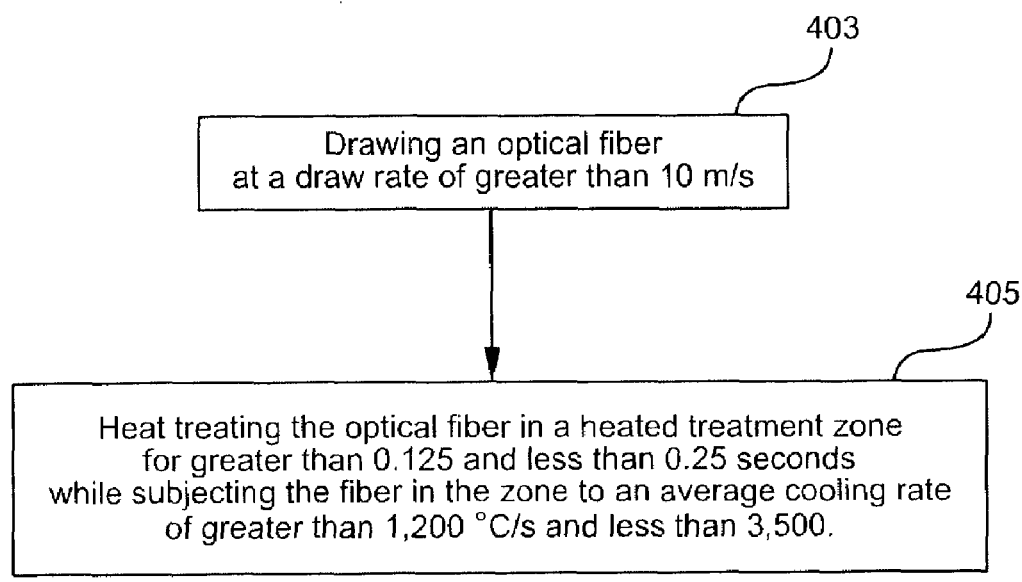
FIG. 8 is a block diagram of an optical fiber drawing and treating method according to embodiments of the present invention.

As shown in FIG. 8, during the steps of drawing 403 and heat treating 405, an atmosphere preferably containing an inert gas is provided. The inert gas may be helium, nitrogen, argon, or mixture thereof Preferably, the inert gas (preferably a helium gas) is supplied at draw furnace inlet 420A at the top of the draw furnace. The inert gas travels alongside of the glass supply preform 402 and exits the draw furnace 420 at a lower end thereof along with the fiber 410. The gas then travels along with the fiber (but generally at a different rate) through the passage 413 of the treatment furnace 450 and exits through a lower end (at point "B") of the treatment furnace. The flow rate of the inert treatment gas (preferably helium) through the passage 413 of the heated treatment zone 412 of the treatment furnace 415 during the step of heat treating is preferably greater than 10 liters/minute, and most preferably between 10 and 50 liters/minute.

Figure 12:
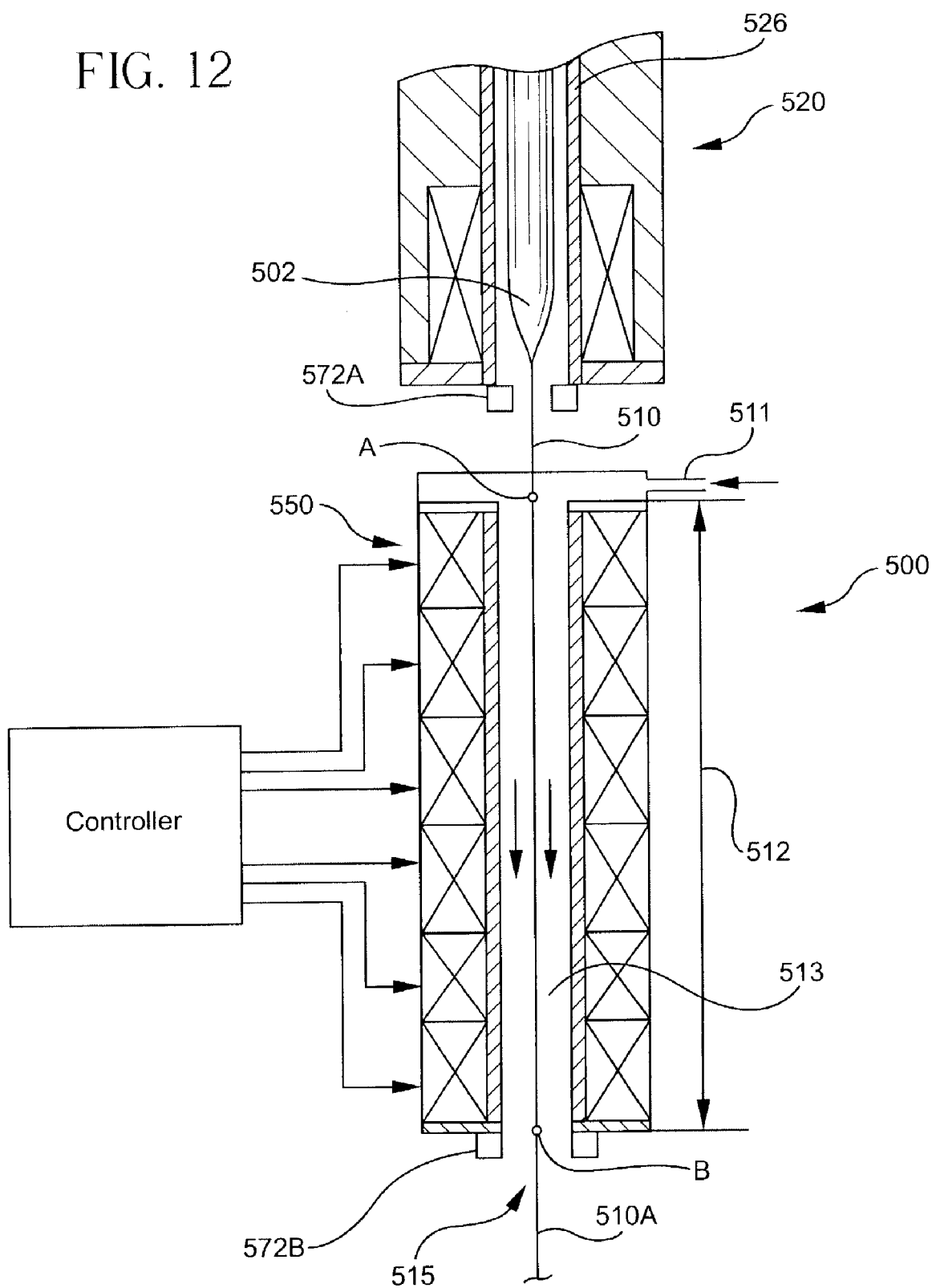
FIG. 12 is a schematic, cross-sectional side view of another optical fiber drawing and heat treating apparatus according to embodiments of the present invention.

Optionally, the draw furnace 520 may be configured such that it is separated from, i.e., the exit end of the draw furnace is not directly connected to the entrance end of the heat treatment furnace 550, as shown in partial view of FIG. 12. In this configuration, the gas atmosphere disposed in the treatment furnace 550 may contain a different gas than in the draw furnace. For example, an atmosphere containing argon only, or mixture of both helium and argon, may be provided inside the passage 513 during the step of heat treating such that the fiber is disposed in an inert atmosphere. Preferably, for example, a draw gas, such as helium, is provided to flow through the draw furnace 520 during the step of drawing, while a treatment gas (such as substantially pure nitrogen, pure argon, or a mixture of substantially pure argon and substantially pure helium) is provided to the treatment furnace 550 during the step of heat treating. For example, as shown in FIG. 12, the treatment gas in the treatment furnace 550 may be provided at input port 511 and extracted at the bottom of the treatment furnace at 515. The flow rate of the inert treatment gas through the passage 513 of the heated treatment zone 512 of the treatment furnace 550 during the step of heat treating is preferably greater than 10 liters/minute, and most preferably between 10 and 50 liters/minute. The additional process components (e.g., additional measurement, cooler apparatus, coating/curing apparatus, and winding apparatus) are not shown for clarity in FIG. 12.

In a preferred embodiment of FIG. 11, the optical fiber 410 is drawn through the heated treatment zone 412 at a draw rate of greater than or equal to 10 m/s; more preferably greater than or equal to 15 m/s; and in some embodiments, greater than or equal to 20 m/s. Preferably, the fiber 410 is a single mode step index fiber such as is shown in FIG. 9 having a germanium dopant in the central core 414 and a substantially pure silica cladding 415. However, it should be recognized that the method described herein is equally useful and adapted for treating any optical fiber having a germanium-doped central core. Preferably, the germanium is present in the core in a sufficient amount to provide a relative refractive index percent of at least 0.3% as compared to the cladding. The fiber 410 is preferably drawn by heating the preform 402 to a flowing consistency (1800–2200° C.) at its draw root and applying a draw tension to the coated optical fiber by using a tensioning apparatus 470 set to provide a tension of between about 25 grams to about 200 grams; more preferably between about 60 and 170 grams; and most preferably about 90–150 grams. Drawing at high speed and tension enables production of large volumes of the optical fiber which is then heat treated in accordance with aspects of the present invention to further minimize the attenuation of the produced fiber as compared to untreated fiber.

The drawn fiber 410 is maintained in the heated treatment zone 412 for a total residence time of greater than 0.07 seconds and less than 0.25 seconds; more preferably greater than 0.07 and less than 0.15 seconds; and in some embodiments less than 0.1 seconds. Following treatment, the fiber then exits the zone 412 at the exit to the treatment zone 412 (point "B"). The average cooling rate for the fiber 410 while passing through the treatment zone 412 is preferably greater than 1,200° C./s and less than 5,000° C./s; more preferably greater than 2,000° C./s and less than 5,000° C./s; and in some embodiments, greater than 2,200° C./s and less than 3,500° C./s. During the treatment step, the walls 414 of furnace's treatment zone 412 are heated and maintained at an appropriate temperature to provide a passage temperature (at the center of the passage 413 where the fiber travels) in at least a portion of the heated treatment zone 412 of greater than 1,300° C.; more preferably between 1,400 and 1,600° C. The heat treating step is accomplished by one or more heaters, which may be resistance-type heaters, for example.

In a preferred embodiment, the treatment furnace 450 includes a plurality of individual heaters (c–h) spaced along the axial length of the treatment furnace 450. Each of the heaters encircles the fiber, and each is preferably individually controlled by a controller 417. During the step of heat treating, the fiber is subjected to heat from multiple heating zones; at least one of the heating zones (each zone roughly corresponding to the physical size of the heaters (c–h)) of the multiple heating zones is set to different temperature as compared to another of the multiple heating zones. Preferably, the temperature of the wall 414 of each heater is controlled by a controller 417 such that at least one of the heating zones c–h has a passage temperature of between 1,400° C. and 1,600° C. In a preferred mode of operation, a first zone (example c) closer to the draw furnace 420 is controlled to have a passage temperature at its center (at point "c'") of between 1,100° C. and 1,300° C., while a second zone (example h) further away from the draw furnace is controlled to have a passage temperature (at point "h'") of between 1,400° C. and 1,500° C. The actual wall temperatures will be set such that the desired fiber exit surface temperature condition is achieved to provide the desired cooling rate. If the gas used is other than helium, for example, the wall temperature would be set to a lower temperature because the thermal conductivity of Argon and mixtures of Agron and Helium would have a lower coefficient of thermal conductivity and, therefore, more of a temperature difference is required between the furnace's passage temperature and the fiber temperature to achieve the same cooling rate.

In accordance with embodiments of the invention, it is preferable to configure and locate the treatment furnace 450 to provide an fiber entry surface temperature of the optical fiber, as it enters the treatment zone 412 of between 1,200° C. and 1,700° C. at point "A"; more preferably between 1,550° C. and 1,700° C.; and in some embodiments, greater than 1,600° C. Preferably also, it is desired to configure the length and operating temperature of the treatment furnace 450 to provide an exit temperature of the optical fiber 410A at an exit of the treatment zone 412 at point "B" of between 1,250° C. and 1,450° C.; more preferably between 1,300° C. and 1,450° C.; and most preferably between 1,325° C. and 1,425° C.

According to one embodiment illustrated in FIG. 11, it is desirable to provide an entry temperature of the optical fiber 410 as the fiber enters the treatment zone 450 (at "A") of between 1,550° C. and 1,700° C.; more preferably between 1,600° C. and 1,700° C., and provide an exit temperature of the heat treated optical fiber 410A as the treated fiber exits the treatment zone 412 (at "B") of between 1,300° C. and 1,450° C., and more preferably between 1,325° C. and 1,425° C.

The muffle tube 416 of the treatment furnace 450 can be preferably manufactured from a substantially pure silica quartz glass, ceramic and/or carbon materials. The heating elements of the treatment furnace are preferably molydisilicide high temperature heating elements available from Kanthal. The inner diameter of the tube 416 is preferably about 60 mm. The construction of the heating furnace of FIG. 12 is such that it has the same components as described for FIG. 11.

As shown in FIG. 12, fiber 510 is drawn from and heat treated by apparatus 500. The fiber 510 is drawn from the heated glass supply 502 at a draw speed of greater than 10 m/s and at a draw tension between 25 and 200 grams. A helium atmosphere is provided in the draw furnace 520. An air entry preventer 572 such as a gas shield, moveable iris, or door mechanism is preferably employed at the lower end of the draw furnace to minimize intrusion of air that may into the furnace chamber that may cause degradation of the graphite muffle tube 526. A multi-element heat treatment furnace 550 is provided downstream from the draw furnace 520. The structure is identical to that described with respect to FIG. 11, except that it is physically separated from the draw furnace 520 by a space where the fiber passes through air. Preferably, the cooling profile in the heated treatment zone 512 of the heat treating furnace 550 is arranged and configured the same as taught in FIG. 10 such that the total residence time in the zone is between 0.07 and 0.25 seconds, and the average cooling rate in the zone 512 is preferably greater than 1,200° C./s and less than 5,000° C./s; more preferably greater than 2,200° C./s and less than 3,500° C./s. Likewise, the heat treatment furnace 550 is configured and positioned such that the fiber entry surface temperature at point A is between 1,400° C. and 1700° C. (between 1,550° C. and 1,700° C. for draw speeds greater than or equal to 15 m/s) and an fiber exit surface temperature of the heat treated optical fiber 510A as the treated fiber exits the treatment zone 512 (at point "B") of between 1,325° C. and 1,425° C.

EXAMPLES

Table 2 below illustrates the results for various experimental examples (13–18) of fiber actually produced using the treatment apparatus of FIG. 11.

TABLE 2

| Ex. | Gas | Draw Rate (m/s) | Draw Tens. (gram) | Entry Temp. (° C.) | Exit Temp. (° C.) | Avg. Cool. Rate (° C./s) | tr (s) | Zone L (m) | Attn. @ 1310 dB/km | Attn. @ 1550 dB/km |
|---|---|---|---|---|---|---|---|---|---|---|
| 13 | He | 10 | 100 | 1,440 | 1,270 | 1,430 | 0.119 | 1.19 | 0.327 | 0.186 |
| 14 | He | 15 | 100 | 1,560 | 1,370 | 1,610 | 0.118 | 1.77 | 0.322 | 0.185 |
| 15 | He | 15 | 100 | 1,560 | 1,270 | 3,670 | 0.079 | 1.19 | 0.326 | 0.185 |
| 16 | He | 15 | 100 | 1,560 | 1,360 | 2,530 | 0.079 | 1.19 | 0.326 | 0.184 |
| 17 | He | 24 | 100 | 1,690 | 1,360 | 4,460 | 0.074 | 1.77 | 0.325 | 0.187 |
| 18 | He | 24 | 100 | 1,690 | 1,380 | 4,190 | 0.074 | 1.77 | 0.325 | 0.186 |

EXAMPLE 13

FIG. 11 shows the apparatus 400 used for producing the treated fiber 410A of Example 13, except that the treatment furnace in this example included only two heater elements. From the preform 402, a single mode step index fiber was drawn having a core of germanium-doped silica and a cladding of substantially pure silica. The fiber was drawn at a draw tension of 100 grams. The refractive index profile of the fiber is shown in FIG. 9 and the profile core delta and radius is selected to provide a total dispersion of the fiber between 16 and 22 ps/nm/km at 1550 nm. The heat treatment furnace 450 is coupled directly to the draw furnace 420 and provides and enclosed pathway for the flow of about 23 liters/minute of substantially pure helium treatment gas from the inlet 420A around the preform 402, through the passageway 413, and exiting at point B. The temperatures of the two heater elements were set to 1,250° C. The treatment zone 412 of the furnace 450 was 1.19 m long and the muffle tube 416 of the treatment furnace 450 was pure quartz having an inner diameter of 60 mm. The optical fiber 410 was drawn at a draw rate of 10 m/s and passed through the treatment furnace 450 such that the total residence time was 0.119 seconds in the zone 412. The fiber's entry surface temperature was 1440° C. and the fiber's exit surface temperature was 1,270° C. Accordingly, the average cooling rate in the treatment zone 412 was 1,430° C./s. The attenuation of the fiber produced in accordance with the method was measured to be 0.327 dB/km at 1310 nm, and 0.186 dB/km at 1550 nm.

EXAMPLE 14

Again, FIG. 11 shows the apparatus 400 used for producing the treated fiber 410A of Example 14. In this example, the heating elements c–d, e–f, and g–h were wired together in pairs such that the combined elements c–d, for example, act as a single heater element. Likewise, e–f and g–h are also wired together, thereby producing three independently controllable heating elements. From the preform 402, a single mode step index fiber was drawn having a core of germanium-doped silica and a cladding of substantially pure silica. The fiber was drawn at a draw tension of 100 grams. The refractive index profile of the fiber is shown in FIG. 9 and was selected to provide a total dispersion of the fiber between 16 and 22 ps/nm/km at 1550 nm. The heat treatment furnace 450 is coupled directly to the draw furnace 420 and thereby forms an enclosed pathway for the flow of about 23 liters/minute of substantially pure helium treatment gas from the inlet 420A around the preform 402, through the passageway 413, and exiting at point B. The temperature of the heater elements c–d, e–f, and g–h were set to 1,250° C., 1,450° C., and 1,450° C., respectively. The treatment zone 412 of the furnace 450 was 1.77 m long and the muffle tube 416 of the treatment furnace 450 was pure quartz tube having an inner diameter of 60 mm. The optical fiber 410 was drawn at a draw speed of 15 m/s and passed through the treatment furnace 450 such that the total residence time was 0.118 seconds in the zone 412. The fiber's entry surface temperature was 1,560° C. and the fiber's exit surface temperature was 1,370° C. Accordingly, the average cooling rate in the treatment zone 412 was 1,610° C./s. The attenuation of the fiber produced for Example 14 was measured to be 0.322 dB/km at 1310 nm, and 0.185 dB/km at 1550 nm.

EXAMPLE 15

The configuration of the apparatus of Example 3 was the same as described for Example 13 (having only two heater elements). From the preform 402, a single mode step index fiber was drawn having a core of germanium-doped silica and a cladding of substantially pure silica. The fiber was drawn at a draw tension of 100 grams. The refractive index profile of the fiber is shown in FIG. 9 and its core delta and radius was selected to provide a total dispersion of the fiber between 16 and 22 ps/nm/km at 1550 nm. The heat treatment furnace 450 is coupled directly to the draw furnace 420 and forms an enclosed pathway for the flow of about 23 liters/minute of substantially pure helium treatment gas from the inlet 420A around the preform 402, through the passageway 413, and exiting at point B. The temperatures of the two heater elements were set to 1,150° C. The treatment zone 412 of the furnace 450 was 1.19 m long and the muffle tube 416 of the treatment furnace 450 was pure quartz having an inner diameter of 60 mm. The optical fiber 410 was drawn at a draw rate of 15 m/s and passed through the treatment furnace 450 such that the total residence time was 0.079 seconds in the zone 412. The fiber's entry surface temperature was 1,560° C. and the fiber's exit surface temperature was 1,270° C. Accordingly, the average cooling rate in the treatment zone 412 was 3,670° C./s. The attenuation of the fiber produced in accordance with the method was measured to be 0.326 dB/km at 1310 nm and 0.185 dB/km at 1550 nm.

EXAMPLE 16

FIG. 11 shows the apparatus 400 used for producing the treated fiber 410A of Example 16. The configuration of the heating elements was the same as described for Examples 13 and 15. From the preform 402, a single mode step index fiber was drawn having a core of germanium-doped silica and a cladding of substantially pure silica. The fiber was drawn at a draw tension of 100 grams. The refractive index profile of the fiber is shown in FIG. 9 was selected to provide a total dispersion of the fiber between 16 and 22 ps/nm/km at 1550 nm. The heat treatment furnace 450 is coupled directly to the draw furnace 420 and forms an enclosed pathway for the flow of about 23 liters/minute of substantially pure helium treatment gas from the inlet 420A around the preform 402, through the passageway 413, and exiting at point B. The temperature of the two heater elements employed were set to 1,300° C. The treatment zone 412 of the furnace 450 was 1.19 m long and the muffle tube 416 of the treatment furnace 450 was pure quartz having an inner diameter of 60 mm. The optical fiber 410 was drawn at a rate of 15 m/s and passed through the treatment furnace 450 such that the total residence time was 0.079 seconds in the zone 412. The fiber's entry surface temperature was 1,560° C. and the fiber's exit surface temperature was 1,360° C. Accordingly, the average cooling rate in the treatment zone 412 was 2,530° C./s. The attenuation of the fiber was measured to be 0.326 dB/km at 1310 nm, and 0.184 dB/km at 1550 nm.

EXAMPLE 17

The apparatus used for producing the treated fiber of Example 17 is the same as described in Example 14. From the preform, a single mode step index fiber was drawn having a core of germanium-doped silica and a cladding of substantially pure silica. The fiber was drawn at a draw tension of 100 grams. The refractive index profile of the fiber is shown in FIG. 9 was selected to provide a total dispersion of the fiber between 16 and 22 ps/nm/km at 1550 nm. The heat treatment furnace 450 is coupled directly to the draw furnace 420 and provides and enclosed pathway for the flow of about 23 liters/minute of substantially pure helium treatment gas from the inlet 420A around the preform 402, through the passageway 413, and exiting at point B. The temperature of the heater elements c–d, e–f, and g–h were set to 1,150° C., 1,150° C. and 1,450° C., respectively. The treatment zone 412 of the furnace 450 was 1.77 m long and the muffle tube 416 of the treatment furnace 450 was pure quartz having an inner diameter of 60 mm. The optical fiber 410 was drawn at a draw rate of 24 m/s and passed through the treatment furnace 450 such that the total residence time was 0.074 seconds in the zone 412. The fiber's entry surface temperature was 1,690° C. and the fiber's exit surface temperature was 1,360° C. Accordingly, the average cooling rate in the treatment zone 412 was 4,460° C./s. The attenuation of the fiber produced in accordance with the method was measured to be 0.325 dB/km at 1310 nm and 0.187 dB/km at 1550 nm.

EXAMPLE 18

The apparatus used for producing the treated fiber of Example 18 is the same as described in Examples 14 and 17. From the preform 402, a single mode step index fiber was drawn having a core of germanium-doped silica and a cladding of substantially pure silica. The fiber was drawn at a draw tension of 100 grams. The refractive index profile of the fiber is shown in FIG. 9 was selected to provide a total dispersion of the fiber between 16 and 22 ps/nm/km at 1550 nm. The heat treatment furnace 450 is coupled directly to the draw furnace 420 and provides and enclosed pathway for the flow of about 23 liters/minute of substantially pure helium treatment gas from the inlet 420A around the preform 402, through the passageway 413, and exiting at point B. The temperature of the heater elements c–d, e–f, and g–h were set to 1,150° C., 1,150° C. and 1,550° C., respectively. The treatment zone 412 of the furnace 450 was 1.77 m long and the muffle tube 416 of the treatment furnace 450 was pure quartz having an inner diameter of 60 mm. The optical fiber 410 was drawn at 24 m/s and passed through the treatment furnace 450 such that the total residence time was 0.074 seconds in the zone 412. The fiber's entry surface temperature was 1,690° C. and the fiber's exit surface temperature was 1,380° C. Accordingly, the average cooling rate in the treatment zone 412 was 4,190° C./s. The attenuation of the fiber was measured to be 0.325 dB/km at 1310 nm and 0.186 dB/km at 1550 nm.

Table 3 below illustrates the calculated results for various theoretical examples (Examples 19–22) using the treatment apparatus of FIG. 11.

TABLE 3

| Ex. | Gas | Draw Rate (m/s) | Draw Tens. (gram) | Entry Temp. (° C.) | Exit Temp. (° C.) | Avg. Cool. Rate (° C./s) | tr (s) | Zone L (m) | Attn. @ 1310 dB/km | Attn. @ 1550 dB/km |
|---|---|---|---|---|---|---|---|---|---|---|
| 19 | He | 10 | 100 | 1,650 | 1,350 | 1,500 | 0.200 | 2.0 | 0.316 | 0.183 |
| 20 | He | 15 | 100 | 1,650 | 1,370 | 2,110 | 0.133 | 2.0 | 0.318 | 0.184 |
| 21 | He | 20 | 100 | 1,650 | 1,380 | 2,700 | 0.100 | 2.0 | 0.320 | 0.185 |
| 22 | He | 24 | 100 | 1,650 | 1,390 | 3,130 | 0.083 | 2.0 | 0.320 | 0.185 |

In the theoretical examples provided in Table 3, it should be recognized that for high speed treatment of fibers having germania-doped central core and substantially pure silica cladding as shown in FIG. 9, the desired cooling rate is preferably greater than 1,200° C./s; and more preferably greater than 1,200° C./s and less than 5,000° C./s. Preferably, the total residence time in the heated treatment zone is between 0.07 and 0.25 seconds; and more preferably between 0.07 and 0.15 seconds.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of manufacturing optical fiber, comprising the steps of:

drawing the optical fiber from a heated glass source at a draw rate of greater than or equal to 10 m/s, heat treating the optical fiber by maintaining the optical fiber in a heated treatment zone for a total residence time greater than 0.07 seconds and less than 0.25 seconds while subjecting the optical fiber to an average cooling rate in the heated treatment zone, defined as a fiber entry surface temperature minus a fiber exit surface temperature divided by the total residence time of the optical fiber in the heated treatment zone, of greater than 2,500° C./s and less than 3,500° C./s;

wherein the method further comprises subjecting the fiber to at least two heating zones during heat treating, wherein a first zone closer to the draw furnace is controlled to have a temperature between 1,100°C. and 1,300°C. and a second zone further downstream from the draw furnace is controlled to a temperature between 1,400°C. and 1,500°C.

2. A method of manufacturing an optical fiber according to claim 1 wherein the step of drawing further comprises forming the optical fiber to have a germania-doped central core and a cladding including substantially pure silica.

3. A method of manufacturing an optical fiber according to claim 1 further comprising a step of providing an atmosphere containing helium gas during the steps of drawing and heat treating.

4. A method of manufacturing an optical fiber according to claim 1 further comprising a step of subjecting the optical fiber disposed in the heated treatment zone to a gas atmosphere containing both helium and argon during the step of heat treating.

5. A method of manufacturing an optical fiber according to claim 1 further comprising a step of forming a continuously enclosed path for the optical fiber as it passes between the drawing and heat treatment steps such that the fiber is free from air exposure.

6. A method of manufacturing an optical fiber according to claim 1 further comprising the step of flowing, during the step of heat treating, an inert gas through the heated treatment zone having a flow rate between 10 and 50 liters/minute.

7. A method of manufacturing an optical fiber according to claim 1 further comprising a step of providing the fiber entry surface temperature of the optical fiber as it enters the treatment zone to be between 1,200° C. and 1,700° C.

8. A method of manufacturing an optical fiber according to claim 1 further comprising a step of providing the fiber entry surface temperature of the optical fiber entering the treatment zone to be between 1,550° C. and 1,700° C.

9. A method of manufacturing an optical fiber according to claim 1 further comprising the step of providing the fiber entry surface temperature of the optical fiber to be greater than 1,600° C.

10. A method of manufacturing an optical fiber according to claim 1 further comprising the step of providing the fiber exit surface temperature of the optical fiber at an exit of the treatment zone to be between 1,250° C. and 1,450° C.

11. A method of manufacturing an optical fiber according to claim 10 wherein the fiber exit surface temperature is between 1,325° C. and 1,425° C.

12. A method of manufacturing an optical fiber according to claim 1 further comprising steps of:
providing the fiber entry surface temperature as the fiber enters the treatment zone to be between 1,550° C. and 1,700° C., and
providing the fiber exit surface temperature of the optical fiber as the fiber exits the treatment zone to be between 1,325° C. and 1,425° C.

13. A method of manufacturing an optical fiber according to claim 1 wherein the total residence time is greater than 0.07 and less than 0.15 seconds.

14. A method of manufacturing an optical fiber according to claim 1 wherein the total residence time is less than 0.10 seconds.

15. A method of manufacturing an optical fiber according to claim 1 wherein the draw speed is greater than or equal to 15 m/s.

16. A method of manufacturing an optical fiber according to claim 15 wherein the draw speed is greater than or equal to 20 m/s.

17. The method according to claim 1 wherein the fiber is drawn at a draw tension from about 25 grams to about 200 grams.

18. The method according to claim 17 wherein the draw tension is between about 60 and 170 grams.

19. The method according to claim 1 wherein the heated glass source is an optical fiber preform including a germanium-doped central core region and a substantially pure silica cladding region, and the draw rate is greater than or equal to 20 m/s.

20. The method according to claim 1 wherein the heated glass source is an optical fiber preform having a germania-doped central core region and a substantially pure silica cladding region, the draw rate is greater than or equal to 15 m/s, and the step of heat treating includes providing the fiber entry surface temperature of the optical fiber into the heated treatment zone to be greater than 1,600° C. and the fiber exit surface temperature of the optical fiber from the heated treatment zone to be greater than 1,350° C.

21. The method according to claim 1 wherein the heated glass source is an optical fiber preform having a germania-doped central core region and a substantially pure silica cladding region, and the step of heat treating includes providing the fiber entry surface temperature of the optical fiber into the heated treatment zone to be between 1,500° C. and 1,700° C., and the fiber exit surface temperature of the optical fiber from the heated treatment zone is between 1,350° C. and 1,400° C.

22. A method of manufacturing optical fiber, comprising the steps of:
providing a heated glass preform having a germania-doped central core region and a substantially pure silica cladding region,
drawing the optical fiber from a heated glass preform at a draw rate of greater than or equal to 15 m/s and at a draw tension between 25 and 200 grams, and
heat treating the optical fiber in a heated treatment zone having an atmosphere containing helium flowing at greater than 10 liters/minute, and having a fiber entry surface temperature of the optical fiber into the heated treatment zone is greater than 1,600° C., a fiber exit surface temperature of the optical fiber from the heated treatment zone between 1,300° C. and 1,400° C., and the optical fiber is maintained in the heated treatment zone for a total residence time of greater than 0.07 and less than 0.15 seconds while controlling an average cooling rate of the optical fiber in the heated treatment zone to be greater than 2,000° C./s and less than 3,500° C./s.

23. A method of manufacturing optical fiber, comprising the steps of:
drawing the optical fiber from a heated glass source at a draw rate of greater than or equal to 10 m/s, and
heat treating the optical fiber by maintaining the optical fiber in a heated treatment zone for a total residence time greater than 0.07 seconds and less than 0.25 seconds while subjecting the optical fiber to an average cooling rate in the heated treatment zone, defined as a fiber entry surface temperature minus a fiber exit surface temperature divided by the total residence time of the optical fiber in the heated treatment zone, of greater than 1,200° C./s and less than 5,000°C./s,
wherein during the step of heat treating, the optical fiber is exposed to a furnace temperature in at least a part of the heated treatment zone of greater than 1,300° C., and
wherein the fiber is subjected to multiple heating zones during the step of heat treating, at least one heating zone of the multiple heating zones being set to different temperature as compared to another of the multiple heating zones;
wherein the at least one heating zone of the multiple heating zones is controlled to have a temperature of between 1,400° C. and 1,600° C; and
wherein a first zone closer to the draw furnace is controlled to have a temperature between 1,100° C. and 1,300° C. and a second zone further downstream from the draw furnace to a temperature between 1,400° C. and 1,500° C.

* * * * *